United States Patent
Aoki

(10) Patent No.: US 11,491,604 B2
(45) Date of Patent: Nov. 8, 2022

(54) WORK TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 28 days.

(21) Appl. No.: 17/135,428

(22) Filed: Dec. 28, 2020

(65) Prior Publication Data
US 2021/0114162 A1 Apr. 22, 2021

Related U.S. Application Data

(63) Continuation of application No. 16/414,053, filed on May 16, 2019, now Pat. No. 10,906,153.

(30) Foreign Application Priority Data

Jun. 1, 2018 (JP) .............................. JP2018-106419
Jun. 1, 2018 (JP) .............................. JP2018-106420

(51) Int. Cl.
*B24B 45/00* (2006.01)
*B24B 23/02* (2006.01)
(Continued)

(52) U.S. Cl.
CPC .......... *B24B 23/022* (2013.01); *B24B 45/006* (2013.01); *B25F 3/00* (2013.01); *B27B 5/32* (2013.01); *B23B 31/19* (2013.01)

(58) Field of Classification Search
CPC ....... B23B 31/10; B23B 31/19; B23D 61/006; B24B 23/02; B24B 23/022; B24B 23/04;
(Continued)

(56) References Cited

U.S. PATENT DOCUMENTS 5,157,873 A 10/1992 Rudolf et al.
6,179,697 B1 1/2001 Shibai
(Continued)

FOREIGN PATENT DOCUMENTS

JP H11-262867 A 9/1999
JP 2007-533472 A 11/2007
(Continued)

OTHER PUBLICATIONS

Jan. 5, 2022 Office Action issued in Japanese Patent Application No. 2018-106420.
(Continued)

*Primary Examiner* — Chwen-Wei Su
(74) *Attorney, Agent, or Firm* — Oliff PLC

(57) ABSTRACT

A work tool includes a spindle and a clamp shaft. The spindle is supported to be rotatable around a driving axis defining an up-down direction of the work tool. The clamp shaft includes a shaft part and a fixing part. The shaft part extends coaxially with the spindle. The fixing part is coupled to the shaft part on a lower side of the spindle. The clamp shaft is supported to be movable in the up-down direction relative to the spindle. The clamp shaft is configured to be biased upward and to fix the tool accessory to a lower end portion of the spindle by the fixing par. The fixing part is configured to be removable from the shaft part and to be integrally coupled to the shaft part only by moving upward relative to the shaft part.

20 Claims, 10 Drawing Sheets

(51) Int. Cl.
  *B27B 5/32* (2006.01)
  *B25F 3/00* (2006.01)
  *B23B 31/19* (2006.01)

(58) Field of Classification Search
  CPC ....... B24B 45/006; B27B 19/006; B27B 5/30; B27B 5/32; Y10T 279/33; B25F 3/00; B25F 5/02; A61B 17/142
  See application file for complete search history.

(56) References Cited

U.S. PATENT DOCUMENTS

| | | | |
|---|---|---|---|
| 7,344,435 B2 | 3/2008 | Pollak et al. | |
| 8,182,316 B2 | 5/2012 | Peisert | |
| 8,960,688 B2 | 2/2015 | Zhou | |
| 9,539,682 B2 | 1/2017 | Kawakami et al. | |
| 9,669,536 B2 | 6/2017 | Ito et al. | |
| 11,207,742 B2 * | 12/2021 | Gao | B23D 61/00 |
| 2007/0060030 A1 | 3/2007 | Pollak et al. | |
| 2009/0197514 A1 | 8/2009 | Peisert | |
| 2011/0230125 A1 | 9/2011 | Lin | |
| 2016/0184956 A1 | 6/2016 | Klabunde et al. | |
| 2016/0221175 A1 | 8/2016 | Aoki | |
| 2016/0288288 A1 | 10/2016 | Klabunde et al. | |
| 2017/0050292 A1 | 2/2017 | Aoki | |
| 2019/0262970 A1 * | 8/2019 | Luescher | B24B 45/006 |
| 2020/0164485 A1 * | 5/2020 | Sinzig | B24B 45/006 |

FOREIGN PATENT DOCUMENTS

| | | |
|---|---|---|
| JP | 2013-086213 A | 5/2013 |
| JP | 2016-529118 A | 9/2016 |
| JP | 2016-529119 A | 9/2016 |

OTHER PUBLICATIONS

Dec. 21, 2021 Office Action issued in Japanese Patent Application No. 2018-106419.

Aug. 4, 2022 Office Action issued in Japanese Application No. 2018-106419.

* cited by examiner

WORK TOOL

CROSS-REFERENCE TO RELATED APPLICATIONS

This application is a continuation application of U.S. patent application Ser. No. 16/414,053, filed May 16, 2019, which claims priority to Japanese patent application No. 2018-106419 filed on Jun. 1, 2018, and Japanese patent application No. 2018-106420 filed on Jun. 1, 2018. The contents of the foregoing applications are fully incorporated herein by reference.

TECHNICAL FIELD

The present disclosure relates to a work tool which is configured to perform an operation on a workpiece by driving a tool accessory.

BACKGROUND ART

A work tool is known which is configured to perform an operation on a workpiece by transmitting an output of a motor to a spindle and driving a tool accessory fixed to a lower end of the spindle. Among such work tools, a work tool is known in which a tool accessory can be fixed to a spindle without using an auxiliary tool such as a spanner. For example, in Japanese Translation of PCT International Application Publication No. 2007-533472, a work tool is disclosed which is configured to bias a clamp shaft inserted into a spindle upward by a spring force of a spring element and thereby clamp a tool accessory between a lower end portion of the spindle and a lower end portion (flange) of the clamp shaft.

SUMMARY

In the work tool disclosed in the above-described publication, the clamp shaft is inserted into a hole of the spindle and held by a lock assembly disposed inside the spindle during operation, and is pulled out of the spindle at the time of replacement of the tool accessory. Therefore, foreign matters may enter the tool body through the hole of the spindle, which may cause early deterioration of an internal mechanism (for example, the lock assembly). Further, if any defect occurs in the internal mechanism, the tool body needs to be disassembled for repair. Therefore, further improvement is desired in this work tool.

Accordingly, it is an object of the present disclosure to provide a rational structure for fixing a tool accessory to a spindle in a work tool.

According to one aspect of the present disclosure, a work tool is provided which is configured to perform an operation on a workpiece by driving a tool accessory. The work tool includes a spindle and a clamp shaft.

The spindle is supported to be rotatable around a driving axis, which defines an up-down direction of the work tool. The clamp shaft includes a shaft part, which extends coaxially with the spindle, and a fixing part, which is coupled to the shaft part on a lower side of the spindle. The clamp shaft is supported to be movable in the up-down direction relative to the spindle. Further, the clamp shaft is configured to be biased upward and to fix a tool accessory to a lower end portion of the spindle by the fixing part. The fixing part is configured to be removable from the shaft part and to be integrally coupled to the shaft part only by moving upward relative to the shaft part.

The work tool according to the present aspect generally refers to a work tool which is configured to drive the tool accessory fixed to the spindle which is rotatable around the driving axis. Examples of such a work tool may include an oscillating tool and a rotary tool. The oscillating tool refers to a work tool configured to oscillatorily drive the tool accessory by the spindle which is reciprocally rotated within a specified angle range around the driving axis. The rotary tool refers to a work tool configured to rotationally drive the tool accessory by the spindle which is rotated around the driving axis. Examples of the rotary tool may include a grinder, a sander and a polisher.

In one aspect of the present disclosure, the fixing part may include a housing member and an engagement member. The engagement member may be housed in the housing member so as to be movable between an engagement position, in which the engagement member is engageable with the shaft part, and a disengagement position, in which the engagement member is not engageable with the shaft part.

In one aspect of the present disclosure, the engagement member may be biased toward the engagement position.

In one aspect of the present disclosure, the fixing part may include a spring member and a spring receiving member which is biased by the spring member and abuts on the engagement member. The spring receiving member may be configured to apply a biasing force to the engagement member toward the engagement position when the fixing part is coupled to the shaft part. The spring receiving member may also be configured to be moved against the biasing force of the spring member so as to cause the engagement member to be moved to the disengagement position when the fixing part is removed from the shaft part.

In one aspect of the present disclosure, the engagement member and the spring receiving member may respectively have a first inclined surface and a second inclined surface which abut on each other. The engagement member may be moved radially outward relative to the driving axis by cooperation between the first inclined surface and the second inclined surface when the fixing part is removed from the shaft part.

In one aspect of the present disclosure, the shaft part may have a lower end portion which has a groove formed in its outer periphery. The engagement member may have a projection configured to be engaged with the groove when placed in the engagement position. In this case, an inclination angle of a lower surface of the projection relative to the driving axis may be larger than an inclination angle of an upper surface of the projection relative to the driving axis.

In one aspect of the present disclosure, an upper-wall part of the housing member and the engagement member may have a third inclined surface and a fourth inclined surface, respectively. The third and fourth inclined surfaces may be inclined relative to the driving axis and abut on each other. Further, the shaft part may have a lower end portion which has a groove formed in its outer periphery, and the engagement member may have a projection configured to be engaged with the groove when placed in the engagement position. Moreover, the engagement member may be movable in the radial direction relative to the driving axis between the engagement position and the disengagement position, and the engagement member may be pressed against the upper-wall part by the spring receiving member biased upward when the fixing part is coupled to the shaft part, and biased radially inward toward the engagement position by cooperation between the third and fourth inclined surfaces. In this case, the inclination angle of the lower surface of the projection relative to the driving axis may be larger than the inclination angle of the third inclined surface relative to the driving axis.

In one aspect of the present disclosure, the fixing part may further include an operation part provided outside the housing member. In this case, the spring receiving member may be biased upward by the spring member, and the operation part may be configured to move the spring receiving member downward by a user's operation.

In one aspect of the present disclosure, the shaft part may have a lower end portion which has a groove formed in its outer periphery. The engagement member may have a projection configured to be engaged with the groove when placed in the engagement position. The engagement member may be configured to be pushed by a lower end surface of the shaft part to move from the engagement position to the disengagement position and thereafter biased to return to the engagement position where the projection is engaged with the groove, in a process of an upward movement of the fixing part relative to the shaft part.

In one aspect of the present disclosure, the work tool may further include a biasing member configured to bias the clamp shaft upward relative to the spindle.

In one aspect of the present disclosure, the shaft part may be inserted through the spindle so as to be unable to be pulled out of the spindle.

In one aspect of the present disclosure, the engagement member may be movable in a radial direction relative to the driving axis, and the disengagement position may be located radially outward of the engagement position.

In one aspect of the present disclosure, the engagement member may also be movable in the up-down direction relative to the housing member, and the disengagement position may be located below the engagement position.

In one aspect of the present disclosure, an upper-wall part of the housing member and the engagement member may have a third inclined surface and a fourth inclined surface which are inclined relative to the driving axis, respectively. The engagement member may be movable between the engagement position and the disengagement position with the third inclined surface and the fourth inclined surface sliding with each other.

In one aspect of the present disclosure, the fixing part may further include a spring member and a spring receiving member which is biased by the spring member and abuts on the engagement member. The spring receiving member may be configured to apply a biasing force to the engagement member toward the engagement position when the fixing part is coupled to the shaft part. The spring receiving member may also be configured to be moved against the biasing force of the spring member so as to cause the engagement member to be moved to the disengagement position when the fixing part is removed from the shaft part. The engagement member may be pressed against the upper-wall part by the spring receiving member and biased radially inward by cooperation between the third inclined surface and the fourth inclined surface which abut on each other.

In one aspect of the present disclosure, an upper end portion of the projection may have an inclined surface inclined downward and radially inward. The lower end surface of the shaft part may push the inclined surface of the engagement member from above to move the engagement member radially outward to the disengagement position in a process of the upward movement of the fixing part relative to the shaft part.

DETAILED DESCRIPTION OF THE EMBODIMENTS

Figure 1:
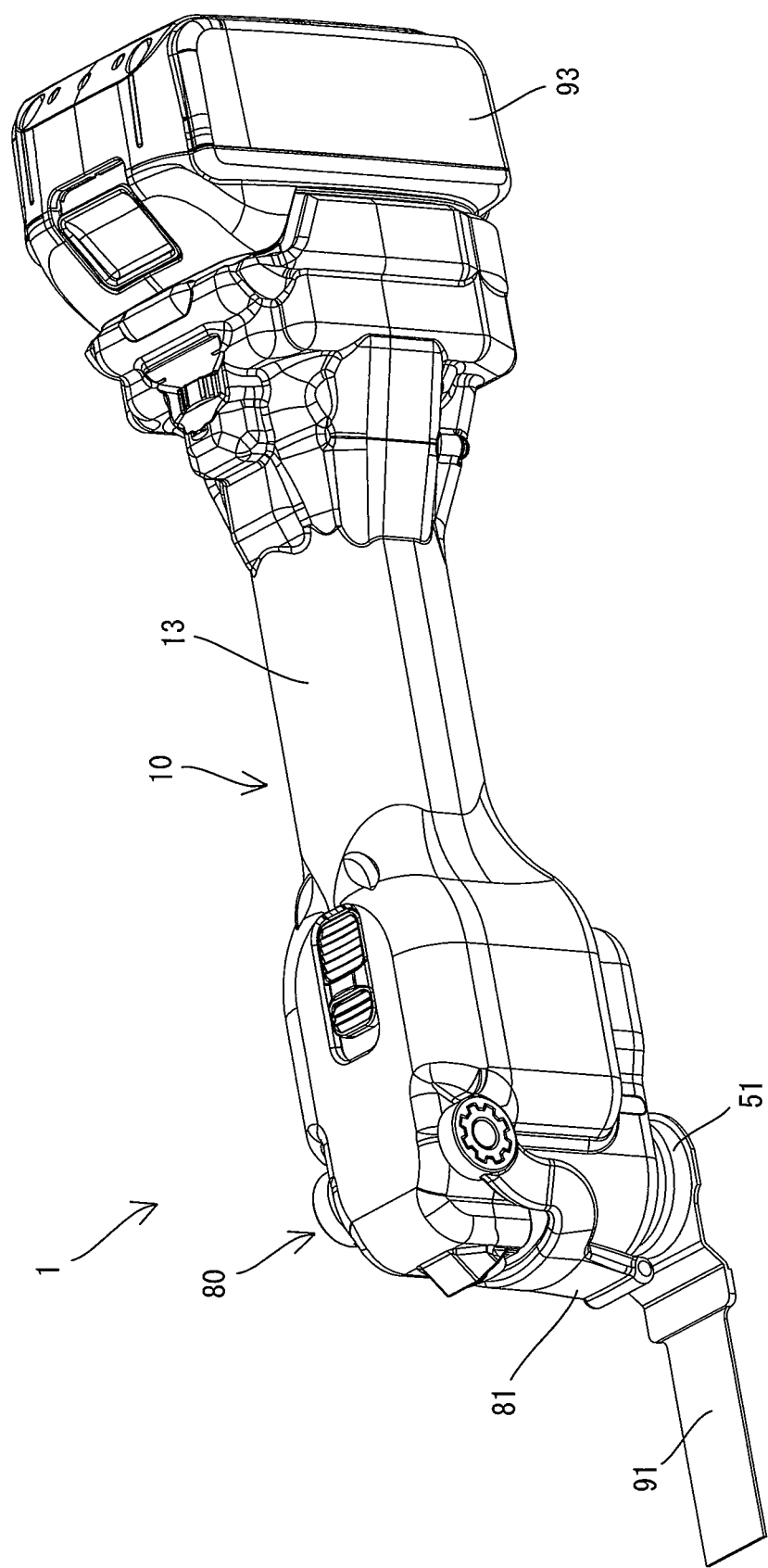
FIG. 1 is a perspective view showing the overall structure of an oscillating tool.

An embodiment is now described with reference to the drawings. In the following embodiment, as an example of a work tool, an electric oscillating tool 1 (see FIG. 1) is described which is configured to perform an operation on a workpiece (not shown) by oscillatorily driving a tool accessory 91. Plural kinds of tool accessories such as a blade, a scraper, a grinding pad and a polishing pad are available as the tool accessories 91 which can be mounted to the oscillating tool 1. In order to perform a desired operation, a user selects one of the tool accessories 91 which is suitable for the desired operation such as cutting, scraping, grinding and polishing, and attaches the tool accessory 91 to the oscillating tool 1. In the drawings referenced below, a blade is shown as an example of the tool accessory 91 mounted to the oscillating tool 1.

Figure 2:
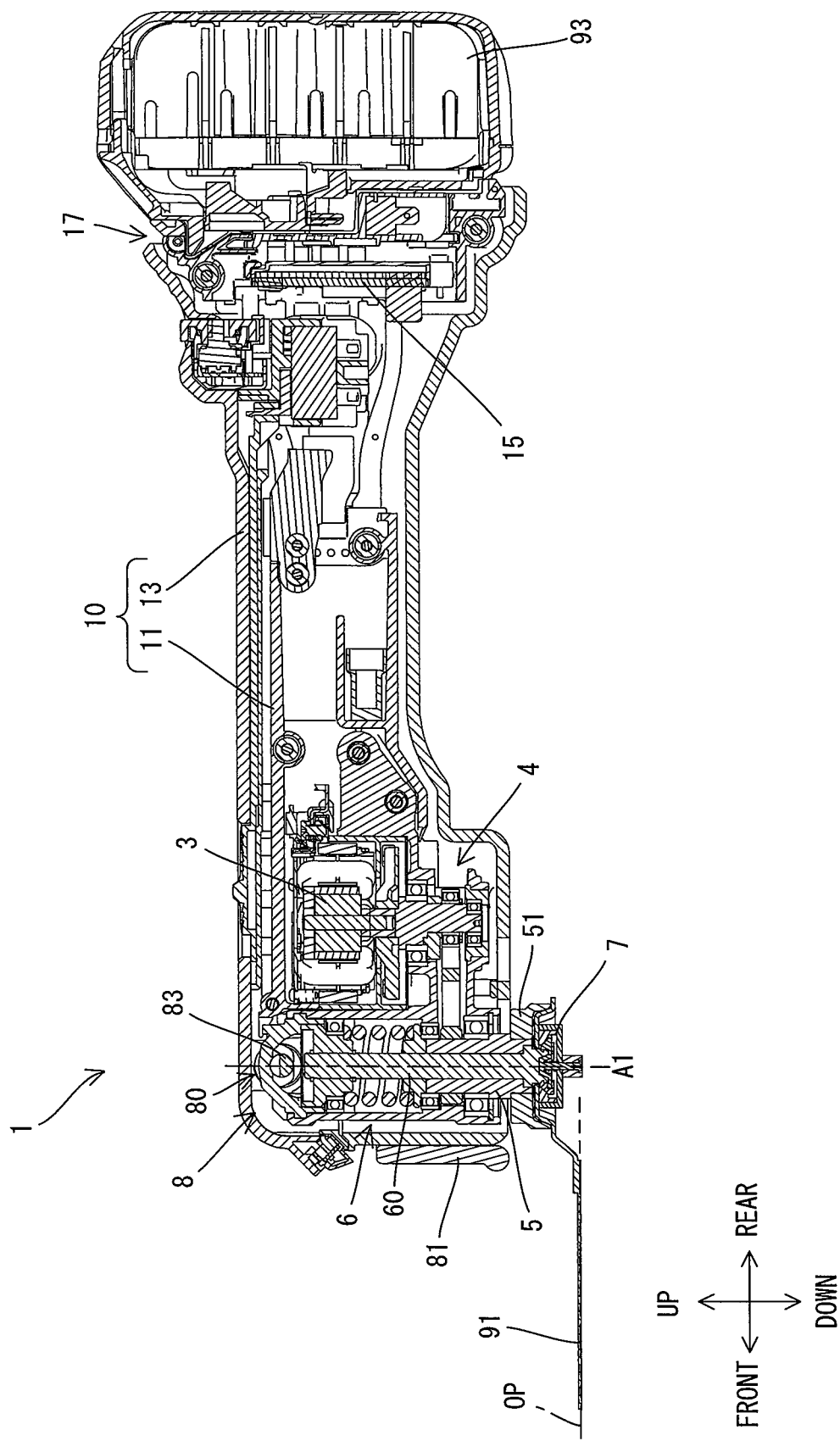
FIG. 2 is a sectional view of the oscillating tool when an operation member is placed in a working position.

First, a general structure of the oscillating tool 1 is described. As shown in FIGS. 1 and 2, the oscillating tool 1 includes an elongate housing (also referred to as a tool body) 10. A spindle 5 and a motor 3 are housed in one end portion (axial end portion) in a longitudinal direction of the housing 10. The spindle 5 is arranged such that its driving axis A1 extends to cross (specifically, to generally orthogonally cross) a longitudinal axis of the housing 10. One end portion (axial end portion) of the spindle 5 in an extending direction of the driving axis A1 (hereinafter also referred to as a driving-axis-A1 direction) protrudes from the housing 10 and is exposed to the outside. The tool accessory 91 can be removably mounted to this exposed portion. Further, a battery 93 for supplying electric power to the motor 3 can be removably mounted to the other end portion (axial end portion) of the housing 10 in the longitudinal direction. The oscillating tool 1 is configured to reciprocally rotate the spindle 5 within a specified angle range around the driving axis A1 by power of the motor 3 and thereby oscillate the tool accessory 91 within a specified angle range in an oscillation plane OP, which is orthogonal to the driving axis A1.

In the following description, for convenience sake, relating to the directions of the oscillating tool 1, the driving-axis-A1 direction is defined as an up-down direction. In the up-down direction, the side of one end portion of the spindle 5 to which the tool accessory 91 is mounted is defined as a lower side, while the opposite side is defined as an upper side. A direction orthogonal to the driving axis A1 and corresponding to the longitudinal direction of the housing 10 is defined as a front-rear direction. In the front-rear direction, the side of one end portion of the housing 10 in which the spindle 5 is housed is defined as a front side, while the side of the other end portion to which the battery 93 is mounted is defined as a rear side. Further, a direction orthogonal to both the up-down direction and the front-rear direction is defined as a right-left direction.

The structure of the oscillating tool 1 is now described in further detail.

First, the housing 10 is described. As shown in FIG. 2, the housing 10 of the present embodiment is configured as a so-called vibration-isolating housing. The housing 10 includes an inner housing 11 and an outer housing 13. The inner housing 11 extends in the front-rear direction and houses the spindle 5 and the motor 3. The outer housing 13 mainly forms an outer shell of the oscillating tool 1. The outer housing 10 extends in the front-rear direction and houses the inner housing 11. A central portion of the outer housing 13 in the front-rear direction has a cylindrical shape having a generally uniform diameter. The central portion of the outer housing 13 forms a grip part to be held by a user. Although not shown in detail, the outer housing 13 is connected to the inner housing 11 via a plurality of elastic members so as to be movable in the front-rear, right-left and up-down directions relative to the inner housing 11.

Figure 3:
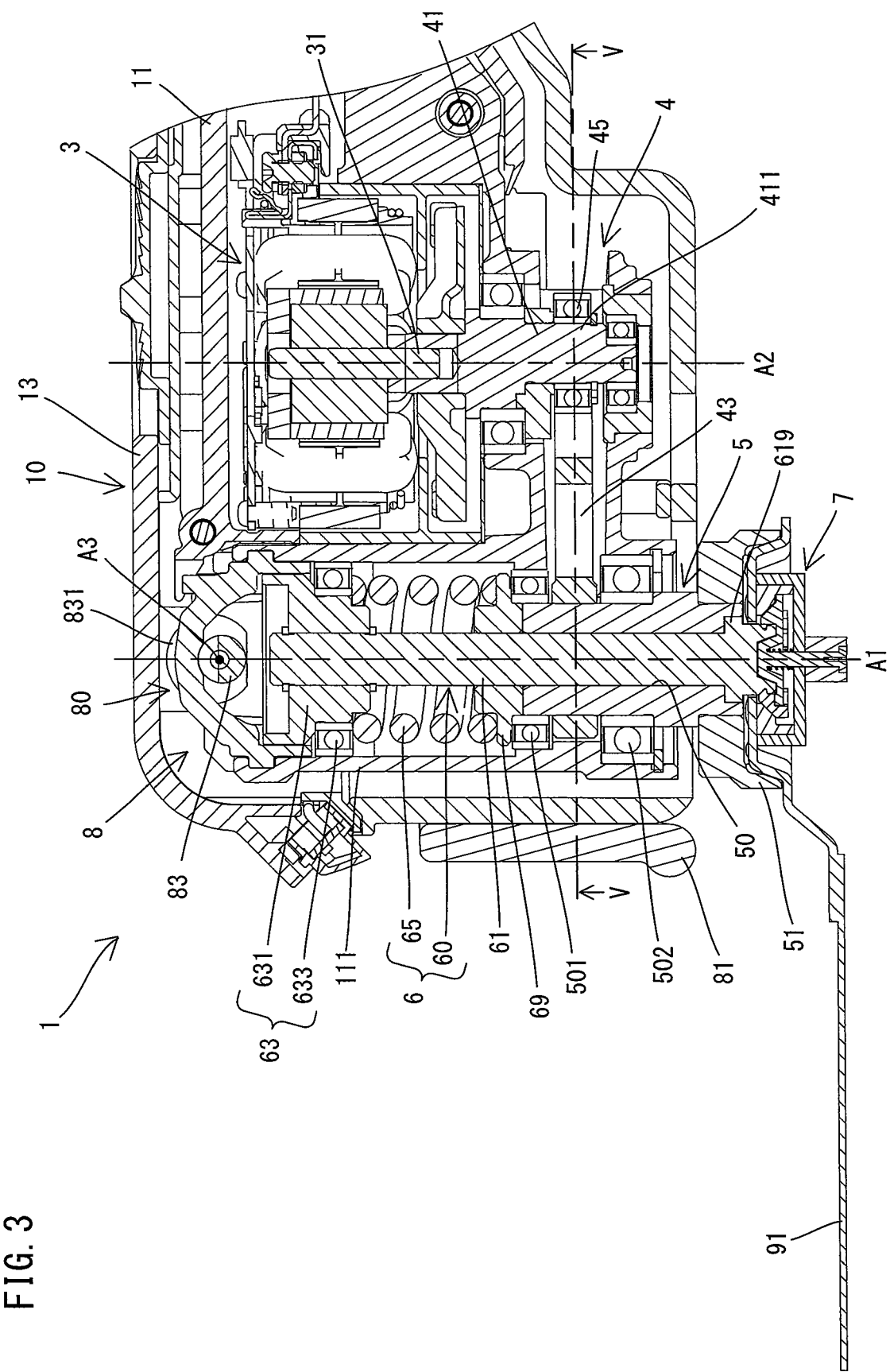
FIG. 3 is a partial, enlarged sectional view of FIG. 2, showing a front end portion of the oscillating tool.
Figure 6:
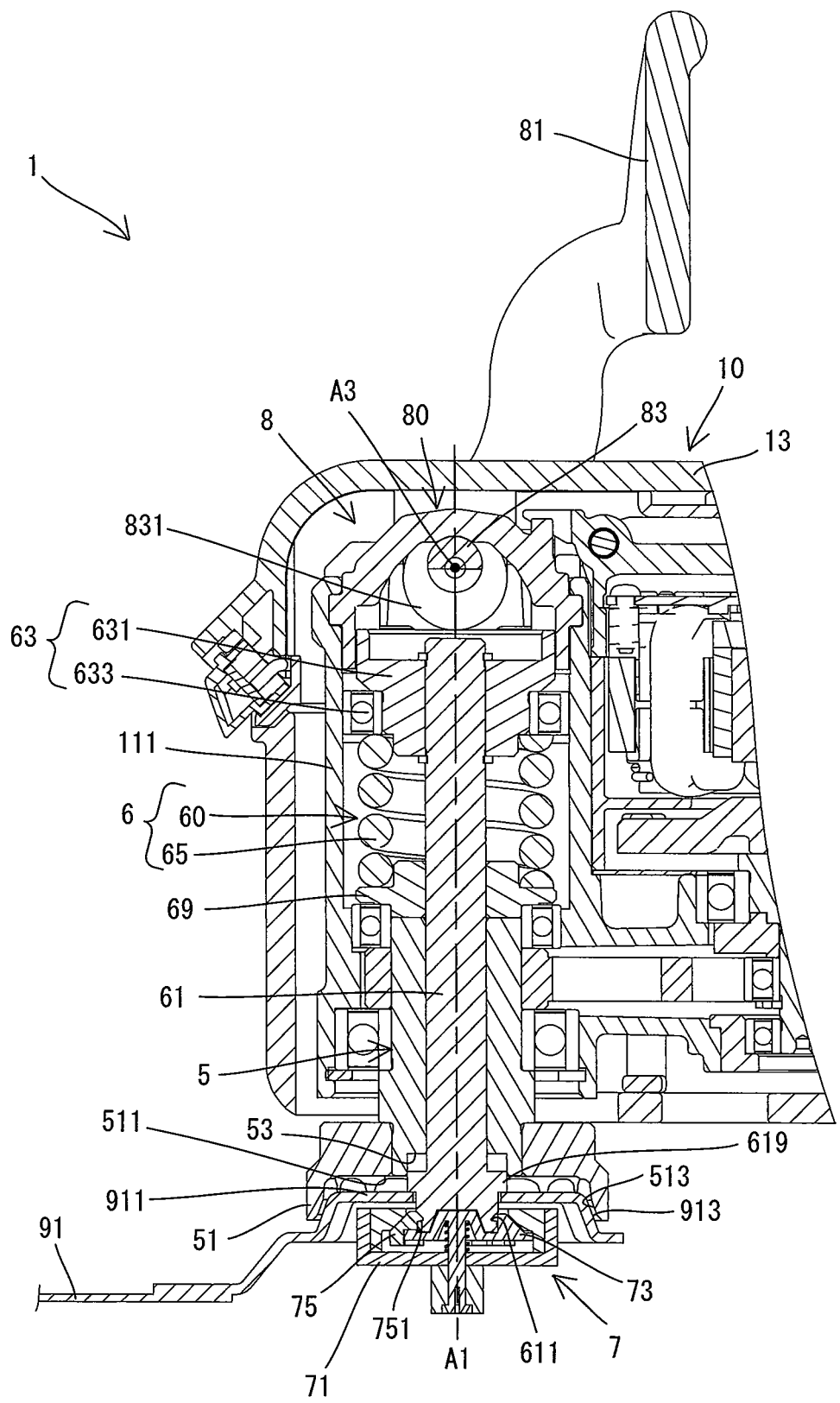
FIG. 6 is a sectional view of the front end portion of the oscillating tool when the operation member is placed in a tool-replacement position.

Further, as shown in FIG. 1, a lever 81 is rotatably supported on an upper front end portion of the housing 10 (the outer housing 13). The lever 81 may be operated by a user to fix and release the tool accessory 91 via a clamping mechanism 6 (see FIG. 3), which will be described later. In the present embodiment, the lever 81 is U-shaped. Both end portions of the lever 81 are fixed to both end portions of a support shaft 83 (see FIG. 3). The support shaft 83 extends through the housing 10 in the right-left direction, orthogonal to the driving axis A1. With such a structure, the lever 81 can be turned around a rotation axis A3, which extends in the right-left direction, between a position (hereinafter referred to as a front position) where a central portion of the lever 81 abuts on a front surface of the housing 10 as shown in FIGS. 1 and 3, and a position (hereinafter referred to as an upper position) where the central portion of the lever 81 is placed above a front end portion of the housing 10 as shown in FIG. 6. The support shaft 83 rotates together with the lever 81 around the rotation axis A3. The lever 81 and the support shaft 83 which are turned in one piece by a user's operation are hereinafter also referred to as an operation member 80, collectively.

The internal structure of the housing 10 is now described. As shown in FIG. 2, a controller 15 for controlling driving of the motor 3, and a battery mounting part 17 configured such that the battery 93 is removably mounted thereto are provided in a rear end portion of the housing 10 (the inner housing 11). Further, as shown in FIG. 3, the spindle 5, the motor 3, a driving mechanism 4, the clamping mechanism 6 and an unclamping mechanism 8 are housed in the front end portion of the housing 10 (the inner housing 11).

As shown in FIG. 3, the spindle 5 is an elongate member having a through hole 50 extending in the up-down direction. In the present embodiment, the spindle 5 is disposed in a lower front end portion of the housing 10 (the inner housing 11), and supported rotatably around the driving axis A1 by two bearings (specifically, ball bearings) 501, 502. A lower end portion of the spindle 5 is exposed from the housing 10 to the outside, and configured as a tool mounting part 51.

Figure 4:
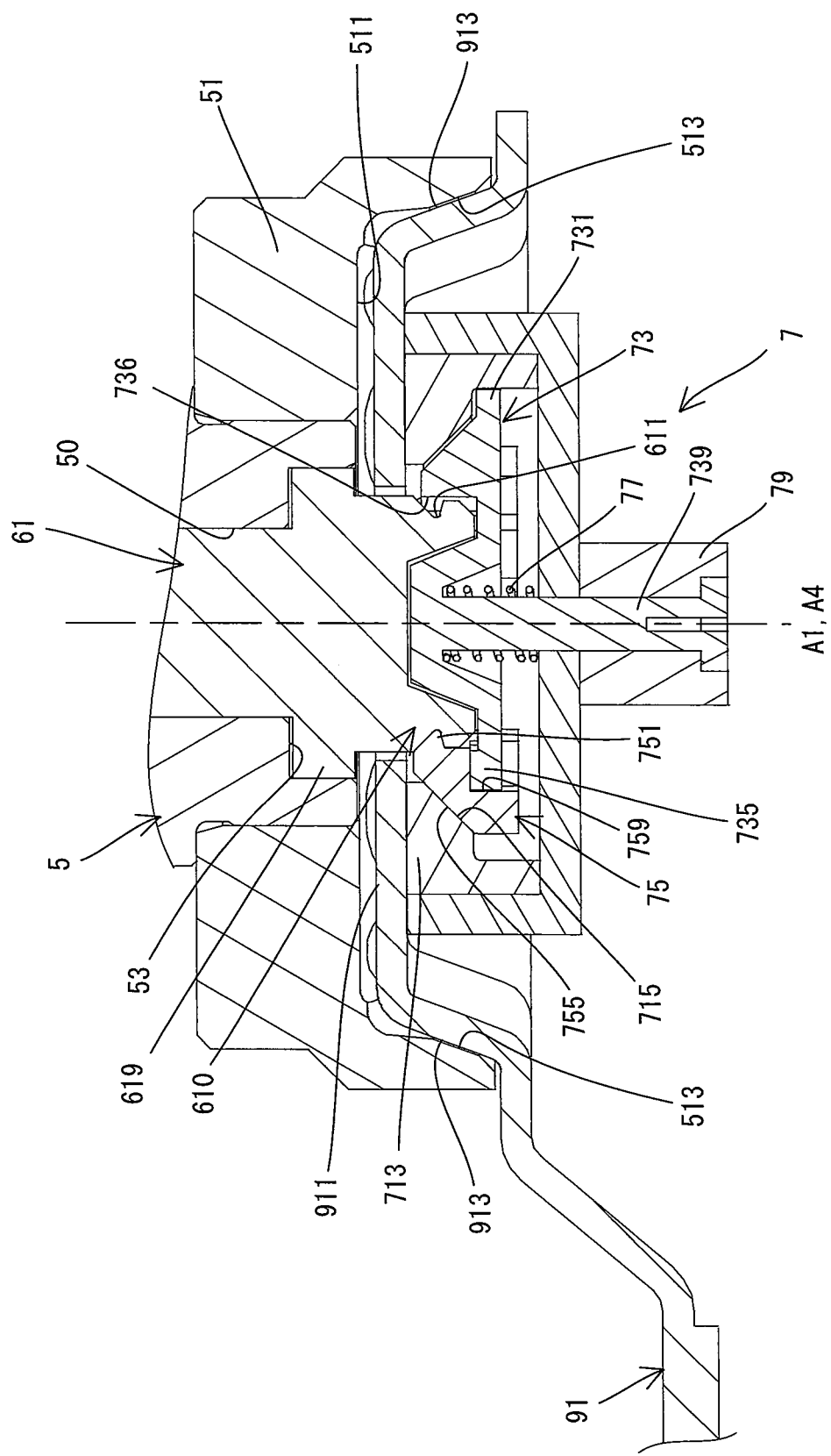
FIG. 4 is a partial, enlarged view of FIG. 3

The tool mounting part 51 is configured such that the tool accessory 91 is removably mounted thereto. As shown in FIG. 4, in the present embodiment, the tool mounting part 51 is shaped like a flange protruding radially outward relative to the driving axis A1. The tool mounting part 51 has an inclined surface 513. The inclined surface 513 is inclined in a direction crossing the driving axis A1. More specifically, a recess 511 recessed upward is formed in a lower end portion of the tool mounting part 51. The inclined surface 513 forms a portion of a surface which defines the recess 511, and is inclined downward in a direction (radially outward) away from the driving axis A1. Any of the tool accessories 91 (such as a blade, a scraper, a grinding pad and a polishing pad) which can be mounted to the oscillating tool 1 of the present embodiment has a protruding part 911 which can be fitted in the recess 511. A portion of an upper surface which defines the protruding part 911 is configured as an inclined surface 913 which conforms to the inclined surface 513. In the present embodiment, the tool accessory 91 is clamped between the tool mounting part 51 and a fixing part 7 of a clamp shaft 60 with the inclined surface 913 being in abutment with the inclined surface 513, and is thereby fixed to the spindle 5. Fixing the tool accessory 91 to the spindle 5 will be described in detail later. Further, a recess 53 is formed in a central portion of the recess 511. The recess 53 has a circular section and recessed further upward from the recess 511.

As shown in FIG. 3, in the present embodiment, a compact high-output brushless direct current (DC) motor is employed as the motor 3. The motor 3 is disposed behind the spindle 5 within the front end portion of the housing 10. The motor 3 is arranged such that a rotation axis A2 of an output shaft 31 which rotates together with a rotor extends in parallel to the driving axis A1 of the spindle 5 (that is, in the up-down direction).

Figure 5:
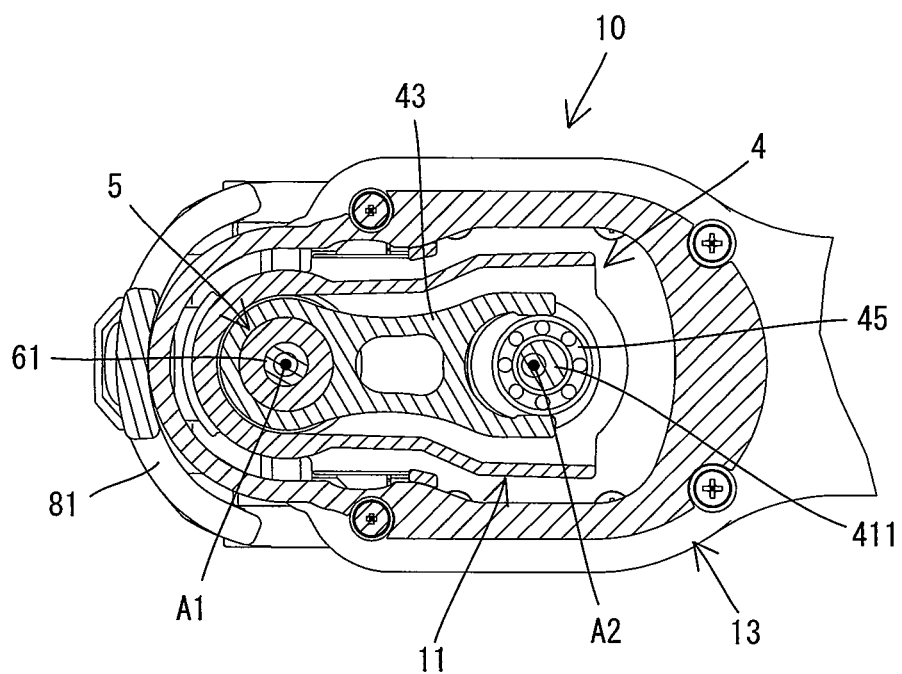
FIG. 5 is a sectional view taken along line V-V in FIG. 3.

The driving mechanism 4 is configured to reciprocally rotate the spindle 5 within a specified angle range around the driving axis A1 by power of the motor 3. As shown in FIGS. 3 and 5, the driving mechanism 4 of the present embodiment includes an eccentric shaft 41, an oscillating arm 43 and a drive bearing 45. The driving mechanism 4 having such a structure is well-known and therefore only briefly described here. The eccentric shaft 41 is coaxially connected to the output shaft 31 of the motor 3 and has an eccentric part 411 eccentric to the rotation axis A2. The drive bearing 45 is fitted onto an outer periphery of the eccentric part 411. The oscillating arm 43 connects the drive bearing 45 and the spindle 5. One end portion of the oscillating arm 43 is annularly shaped and fixed to an outer periphery of the spindle 5 between the bearings 501, 502. The other end portion of the oscillating arm 43 is bifurcated and arranged to abut on an outer periphery of the drive bearing 45 from the right and left.

When the motor 3 is driven, the eccentric shaft 41 rotates together with the output shaft 31. Along with rotation of the eccentric shaft 41, a center of the eccentric part 411 moves around the rotation axis A2 and thus the drive bearing 45 also moves around the rotation axis A2, which causes the oscillating arm 43 to oscillate within the specified angle range around the spindle 5. The spindle 5 reciprocally rotates within the specified angle range around the axis A1 along with the oscillating movement of the oscillating arm 43. As a result, the tool accessory 91 fixed to the spindle 5 (more specifically, to the tool mounting part 51) is oscillatorily driven in the oscillation plane OP (see FIG. 2) to perform an operation.

The clamping mechanism 6 is now described. The clamping mechanism 6 is configured to fix the tool accessory 91 to the tool mounting part 51 such that the tool accessory 91 can rotate together with the spindle 5. As shown in FIG. 3, in the present embodiment, the clamping mechanism 6 includes a clamp shaft 60 and a spring member 65.

The clamp shaft 60 is now described. The clamp shaft 60 as a whole is an elongate member which extends in the up-down direction. The clamp shaft 60 is supported to be movable in the up-down direction relative to the spindle 5. In the present embodiment, the clamp shaft 60 includes a shaft part 61, a fixing part 7 and a spring receiving part 63.

The shaft part 61 is an elongate round rod-like portion which extends in the up-down direction. The shaft part 61 is arranged coaxially with the spindle 5. More specifically, the shaft part 61 is inserted through the through hole 50 of the spindle 5 while a generally upper half of the shaft part 61 protrudes upward from the through hole 50 and a lower end portion of the shaft part 61 protrudes downward from the through hole 50. As shown in FIG. 4, the shaft part 61 has a flange part 619 formed on its lower end portion and protruding radially outward. The flange part 619 has generally the same diameter as the recess 53 of the tool mounting part 51 and can be fitted in the recess 53.

The fixing part 7 is coupled to a portion of the shaft part 61 which extends downward from the flange part 619. This portion of the shaft part 61 is hereinafter referred to as a leading end part 610. An annular groove 611 is formed in an outer periphery of the leading end part 610. As will be described in more detail later, engagement members 75 of the fixing part 7 can be engaged with the groove 611. The groove 611 has a V-shaped (triangular) section. An apex angle of the groove 611 (an angle formed by an upper inclined surface and a lower inclined surface which define the groove 611) is an acute angle. Further, the inclination angle of the lower inclined surface relative to the driving axis A1 is larger than an inclination angle of the upper inclined surface (in other words, the inclination angle of the lower inclined surface relative to a plane orthogonal to the driving axis A1 is smaller than the inclination angle of the upper inclined surface relative to the plane). In the present embodiment, the inclination angle of the upper inclined surface relative to the driving axis A1 is set to be approximately 45 degrees, and the inclination angle of the lower inclined surface is set to be approximately 75 degrees. Further, the leading end part 610 has a cylindrical shape. A peripheral edge of a lower end surface of the leading end part 610 is chamfered to form an inclined surface.

As shown in FIG. 4, the shaft part 61 (specifically, a portion of the shaft part 61 which extends upward from the flange part 619) has a diameter generally equal to the diameter of the through hole 50 of the spindle 5 (the inner diameter of the spindle 5). With such a structure, the shaft part 61 is slidable in the up-down direction along an inner peripheral surface (a surface defining the through hole 50) of the spindle 5. Thus, the inner peripheral surface of the spindle 5 may function as a guide surface to guide a movement of the shaft part 61 in the up-down direction.

The fixing part 7 is a short circular columnar portion which is coupled to the leading end part 610 of the shaft part 61. The fixing part 7 is disposed on the lower side of the tool mounting part 51 of the spindle 5. The fixing part 7 is configured to press the tool accessory 91 upward in abutment with a lower surface of the tool accessory 91 and thereby fix the tool accessory 91 to the tool mounting part 51 when the clamp shaft 60 is placed at an uppermost position. Further, in the present embodiment, the fixing part 7 is configured to be removable from the shaft part 61. The structure of the fixing part 7 will be described in detail later.

As shown in FIG. 3, the spring receiving part 63 is a portion which is fixed to an upper end portion of the shaft part 61 and which is configured to receive one end of the spring member 65. The spring receiving part 63 includes an abutment part 631 and a bearing 633. The abutment part 631 is fixed to the upper end portion of the shaft part 61. The abutment part 631 abuts on the operation member 80 (specifically, an eccentric part 831) when the lever 81 is placed in the upper position. The bearing 633 is a ball bearing having an inner ring and an outer ring. The inner ring is fixed to an outer peripheral surface of the abutment part 631. In the present embodiment, a portion of the inner housing 11 which houses the spindle 5 and the clamping mechanism 6 has a generally circular cylindrical shape. This cylindrical portion is hereinafter referred to as a spindle housing part 111. The outer ring of the bearing 633 is disposed to be slidable along an inner peripheral surface of the spindle housing part 111.

The spring member 65 is provided as a biasing member to bias the clamp shaft 60 upward relative to the spindle 5. In the present embodiment, the spring member 65 is a compression coil spring. The spring member 65 is disposed between the spindle 5 and the spring receiving part 63 fixed to the upper end portion of the clamp shaft 60, while being compressed (loaded) in the up-down direction. More specifically, the spring member 65 is fitted onto the shaft part 61 with its lower end being in abutment with a spring receiving member 69 disposed on an upper end of the spindle 5 and its upper end being in abutment with the spring receiving part 63 (specifically, the abutment part 631 and the inner ring of the bearing 633). The annular spring receiving member 69 is fitted onto the shaft part 61 and arranged to abut on an upper end surface of the spindle 5 and an inner ring of the upper bearing 501.

The clamp shaft 60 is always biased upward by the spring member 65, and is held at an uppermost position within its movable range when the lever 81 is placed in the front position. When the tool accessory 91 is placed between the tool mounting part 51 and the fixing part 7 and the clamp shaft 60 is placed at the uppermost position, as shown in FIG. 4, the tool accessory 91 is pressed against the tool mounting part 51, with the inclined surface 913 being in abutment with the inclined surface 513, by the fixing part 7 abutting on the lower surface of the tool accessory 91, and is thereby fixed to the spindle 5. In other words, the fixing part 7 clamps the tool accessory 91 in cooperation with the tool mounting part 51 by a clamping force (a force of pressing the tool accessory 91 upward against the spindle 5) imparted by the spring member 65. Accordingly, the uppermost position of the clamp shaft 60 is also referred to as a clamping position. When the clamp shaft 60 is placed at the clamping position while clamping the tool accessory 91, the flange part 619 of the shaft part 61 is placed within the recess 53 of the lower end of the spindle 5. At this time, an upper surface of the flange part 619 is slightly spaced apart downward from an upper surface of the recess 53.

The unclamping mechanism 8 is now described. The unclamping mechanism 8 is configured to release the clamping force which is imparted to the fixing part 7 by the spring member 65. As shown in FIG. 3, in the present embodiment, the unclamping mechanism 8 includes the operation member 80 (the lever 81 and the support shaft 83) and the spring receiving part 63. Further, as described above, most of the unclamping mechanism 8 is housed within the housing 10, but the lever 81 is disposed outside the housing 10 to enable an operation by a user.

The support shaft 83 extends in the right-left direction above the clamp shaft 60. The support shaft 83 has an eccentric part (cam part) 831. The eccentric part 831 is disposed above the spring receiving part 63 (specifically, an outer peripheral portion of the abutment part 631) fixed to the upper end portion of the shaft part 61. In the present embodiment, two such eccentric parts 831 are provided to be spaced apart from each other in the right-left direction across the driving axis A1, but only the right eccentric part 831 is shown in FIG. 3. As shown in FIG. 3, when the lever 81 is placed in the front position, a small-diameter part of the eccentric part 831 faces the clamp shaft 60. The eccentric part 831 is located apart from an upper end (the abutment part 631) of the clamp shaft 60 placed in the uppermost position (clamping position), so that the biasing force of the spring member 65 is not applied to the operation member 80. Therefore, the clamp shaft 60 is held in the uppermost position while being biased upward. When the motor 3 is driven in this state, the spindle 5 and the clamp shaft 60 are reciprocally rotated together within the specified angle range. Thus, the tool accessory 91 clamped between the fixing part 7 and the tool mounting part 51 is oscillatorily driven to perform an operation. Accordingly, a position in which the operation member 80 is located when the lever 81 is placed in the front position is also referred to as a working position.

As shown in FIG. 6, when the lever 81 is turned from the front position to the upper position, the eccentric part 831 abuts on the spring receiving part 63 (specifically, the outer peripheral portion of the abutment part 631) from above in a turning process, and pushes the clamp shaft 60 downward while further compressing the spring member 65 against the biasing force. As a result, the clamping force (the force of pressing the tool accessory 91 upward against the spindle 5) which is imparted to the fixing part 7 by the spring member 65 is released. Accordingly, an operation of turning the lever 81 from the front position to the upper position is also referred to as an unclamping operation. The lever 81 of the operation member 80 is held in the upper position while a large-diameter part of the eccentric part 831 abuts on the spring receiving part 63 (the abutment part 631) and the operation part 80 receives the upward biasing force of the spring member 65. When the lever 81 is placed in the upper position, the clamp shaft 60 is placed in a lowermost position within the movable range. At this time, as described above, the clamping force is released. Accordingly, the lowermost position of the clamp shaft 60 is also referred to as an unclamping position. When the clamp shaft 60 is placed in the lowermost position, the tool accessory 91 can be replaced. Accordingly, a position in which the operation member 80 is located when the lever 81 is placed in the upper position is also referred to as a tool-replacement position. The above-described unclamping operation can be rephrased as an operation of moving the operation member 80 from the working position to the tool-replacement position. Replacement of the tool accessory 91 will be described in detail later.

Figure 7:
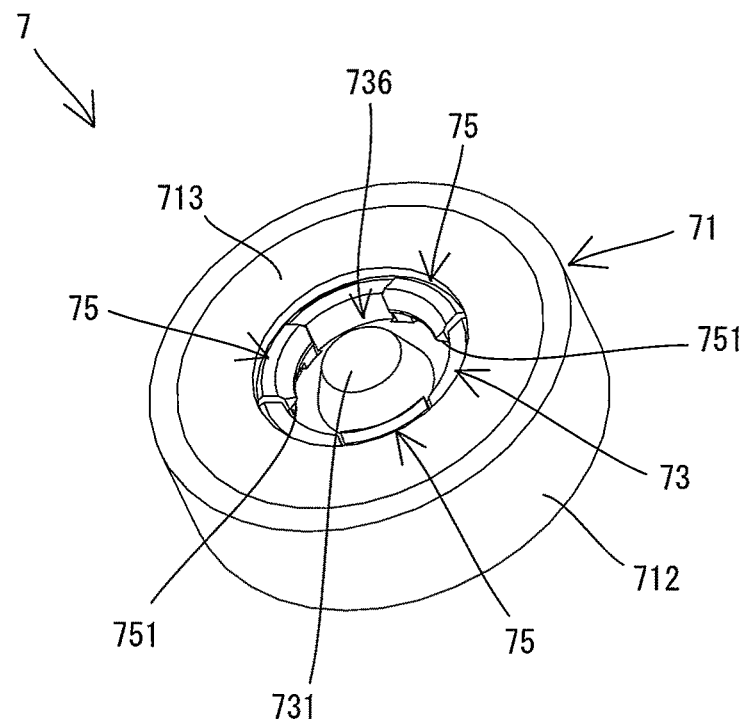
FIG. 7 is a perspective view of a fixing part removed from a shaft part.
Figure 8:
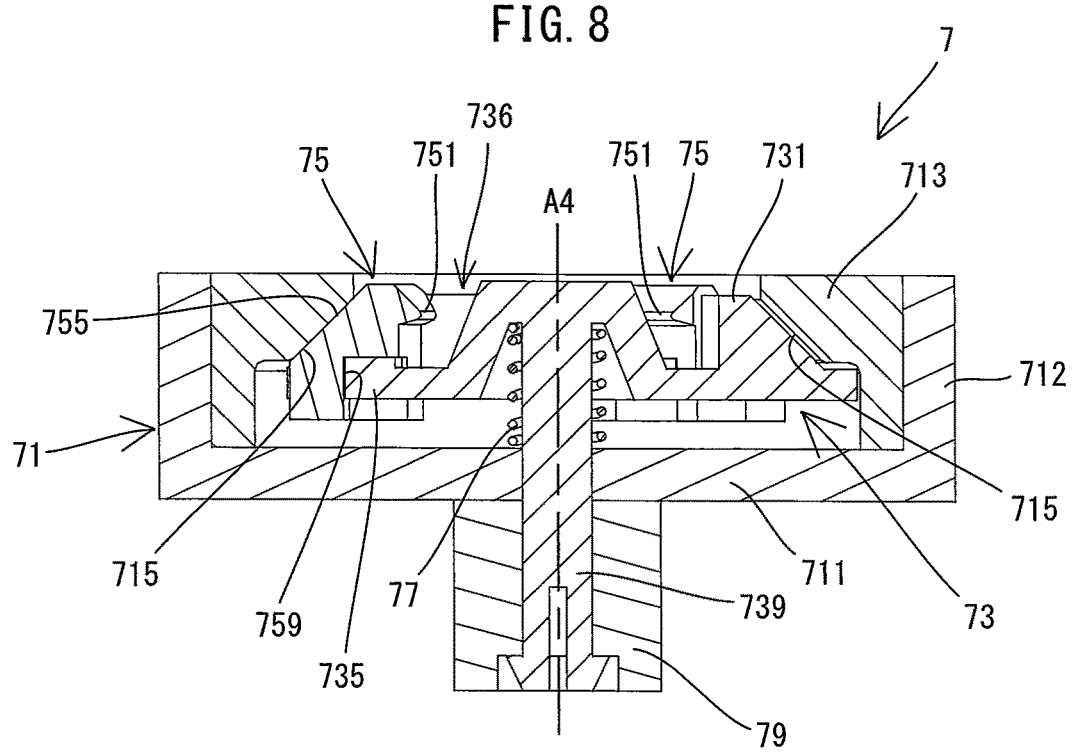
FIG. 8 is a sectional view of the fixing part removed from the shaft part.

The structure of the fixing part 7 is now described in detail. In the present embodiment, as shown in FIGS. 7 and 8, the fixing part 7 has a case 71, a retainer 73, three engagement members 75, a spring member 77 and a knob 79. The following description is made with reference to the drawings showing the fixing part 7 removed from the shaft part 61, but the directions of the fixing part 7 correspond to the directions of the oscillating tool 1 (see FIG. 2) with the fixing part 7 coupled to the shaft part 61.

As shown in FIGS. 7 and 8, the case 71 has a hollow circular cylindrical shape. The fixing part 7 is mounted to the shaft part 61 such that a central axis A4 of the case 71 coincides with the driving axis A1 (a central axis of the shaft part 61) (see FIG. 4). The case 71 includes a circular bottom-wall part 711, a circular cylindrical peripheral-wall part 712 and an annular upper-wall part 713 facing the bottom-wall part 711. A through hole is formed in the center of the bottom-wall part 711. A leg part 739 of the retainer 73 is inserted through the through hole. In the present embodiment, the upper-wall part 713 forms a collar for guiding a movement of the engagement parts 75. A lower surface of the upper-wall part 713 includes an annular inclined surface 715 which is inclined relative to the central axis A4 (the driving axis A1). More specifically, the inclined surface 715 is inclined downward in a direction (radially outward) away from the central axis A4. In the present embodiment, an inclination angle of the inclined surface 715 relative to the central axis A4 (the driving axis A1) is set to be approximately 45 degrees.

The retainer 73 is configured to hold the engagement members 75 within the case 71 while receiving a biasing force of the spring member 77. As shown in FIG. 8, the retainer 73 includes a body 731 disposed within the case 71 and a leg part 739 extending downward from the body 731.

Figure 9:
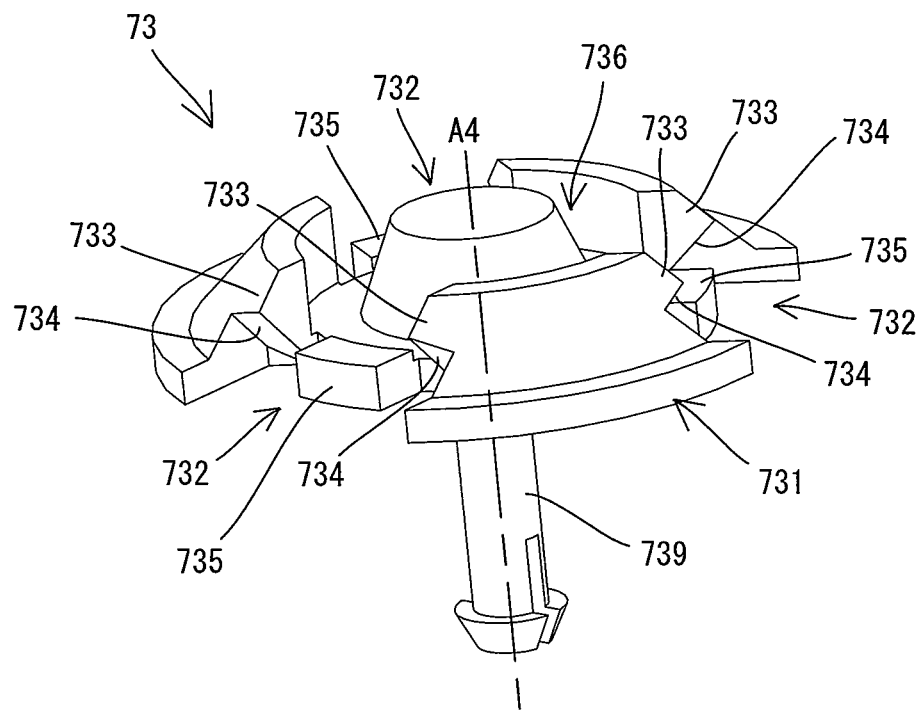
FIG. 9 is a perspective view of a retainer.

As shown in FIG. 9, the body 731 has a generally truncated cone shape as a whole. An outer peripheral surface of the body 731 is formed as an inclined surface generally parallel to the inclined surface 715 (see FIG. 8) of the upper-wall part 713 of the case 7. The body 731 has three holding recesses 732. The engagement members 75 are held in the recesses 732, respectively. The holding recesses 732 are equidistantly formed in a peripheral edge portion of the generally truncated cone-shaped body 731. The holding recesses 732 each have a shape which generally conforms to (matches) the engagement member 75 (see FIG. 10). Portions of the body 731 which define both ends of each of the holding recesses 732 in a circumferential direction around the central axis A4 (the driving axis A1) are configured as abutment parts 733. The abutment parts 733 are configured to abut on shoulder parts 757 of the engagement members 75 from above. A lower surface of each of the abutment parts 733 is an inclined surface 734 which is inclined relative to the central axis A4 (the driving axis A1). More specifically, the inclined surface 734 is inclined downward in a direction (radially inward) toward the central axis A4. Further, a rectangular projection 735 is formed on a radially inner edge of the holding recess 732. An annular recess 736 is formed, corresponding to the cylindrical leading end part 610 of the shaft part 61, in a central portion of the body 731. The annular recess 736 communicates with the holding recesses 732 formed radially outward of the annular recess 736.

As shown in FIG. 8, the leg part 739 protrudes downward from the central portion of the body 731 and is inserted through the through hole of the bottom-wall part 711 of the case 71. A lower portion of the leg part 739 protrudes downward from the bottom-wall part 711, that is, to the outside of the case 71. A cylindrical knob 79 is fixed onto the lower portion of the leg part 739. The knob 79 is disposed on the lower side of the case 71 and provided as an operation part which can be held and operated by a user to move the retainer 73.

Figure 10:
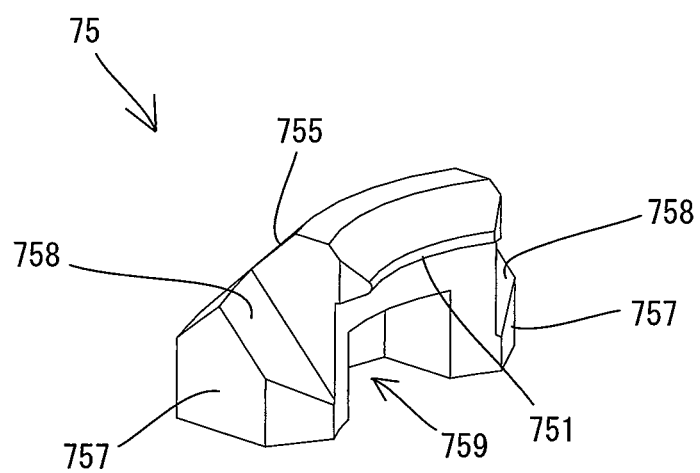
FIG. 10 is a perspective view of an engagement member.

Each of the engagement members 75 is configured to be engaged with the shaft part 61 and housed in the case 71. As shown in FIGS. 8 and 10, the engagement member 75 has a projection (claw) 751. The engagement member 75 is disposed within the holding recess 732 of the retainer 73 (see FIG. 9) such that the projection 751 faces radially inward (toward the shaft part 61). The engagement member 75 is held within the holding recess 732 while its movement in the circumferential direction is restricted and its movement in the radial direction is allowed. The projection 751 is configured to be engaged with the groove 611 (see FIG. 4) of the shaft part 61, and so has a V-shaped (triangular) section generally conforming to (matching) a section of the groove 611. Specifically, an apex angle of the projection 751 (an angle formed by an upper inclined surface and a lower inclined surface of the projection 751) is an acute angle. Further, the inclination angle of the lower inclined surface relative to the central axis A4 (the driving axis A1) is larger than an inclination angle of the upper inclined surface (in other words, the inclination angle of the lower inclined surface relative to a plane orthogonal to the driving axis A1 is smaller than an inclination angle of the upper inclined surface relative to the plane). Further, the inclination angle of the lower inclined surface relative to the central axis A4 (the driving axis A1) is larger than an inclination angle of the inclined surface 715 of the upper-wall part 713 (in other words, the inclination angle of the lower inclined surface relative to a plane orthogonal to the driving axis A1 is smaller than the inclination angle of the inclined surface 715 relative to the plane). In the present embodiment, the inclination angle of the upper inclined surface relative to the central axis A4 (the driving axis A1) is set to be approximately 45 degrees, and the inclination angle of the lower inclined surface is set to be approximately 75 degrees. Further, the inclination angle of an upper inclined surface of the projection 751 is generally equal to the inclination angle of an inclined surface formed in the lower end surface of the leading end part 610 of the shaft part 61.

An outer surface of the engagement member 75 on the radially outward side includes an inclined surface 755 which is inclined relative to the central axis A4 (the driving axis A1). More specifically, the inclined surface 755 is inclined downward in a direction (radially outward) away from the central axis A4. The inclined surface 755 conforms to (matches) the inclined surface 715 of the above-described case 71 (that is, the inclination angle of the inclined surface 755 relative to the central axis A4 (the driving axis A1) is set to be approximately 45 degrees), and the engagement member 75 can slide along the inclined surface 715. Further, the engagement member 75 has the two shoulder parts 757. The shoulder parts 757 form both end portions of the engagement member 75 in the circumferential direction around the central axis A4 (the driving axis A1). An upper surface of each of the shoulder parts 757 is an inclined surface 758 which is inclined relative to the central axis A4 (the driving axis A1). More specifically, the inclined surface 758 is inclined downward in a direction (radially inward) toward the central axis A4. The inclined surface 758 conforms to (matches) the inclined surface 734 of the retainer 73, and the engagement member 75 can slide along the inclined surface 734. Further, a rectangular recess 759 is formed in a radially inner lower end portion of the engagement member 75. The recess 759 can be fitted onto the projection 735 of the retainer 73.

The spring member 77 is provided as a biasing member for biasing the retainer 73 upward relative to the case 71. As shown in FIG. 8, in the present embodiment, the spring member 77 is a compression coil spring. The spring member 77 is disposed between the retainer 73 (specifically, the body 731) and the case 71 (specifically, the bottom-wall part 711) while being compressed (loaded) in the up-down direction.

In the fixing part 7 configured as described above, the retainer 73 is biased upward by the spring member 77 and presses the engagement members 75 against the upper-wall part (collar) 713 from below via the projections 735. The biasing force of the spring member 77 is converted into a radially inward force by abutment between the inclined surface 755 of the engagement member 75 and the inclined surface 715 of the case 71. Thus, each of the engagement members 75 is biased radially inward and held in a position (an innermost position within a movable range of the engagement member 75 in the radial direction) where the projection 751 of the retainer 73 is fitted in the recess 759. As shown in FIGS. 7 and 8, when the engagement member 75 is located in this position, the projection 751 protrudes into the annular recess 736. Therefore, when the shaft part 61 is inserted into the annular recess 736, the projection 751 can be engaged with the groove 611 of the shaft part 61. Accordingly, the position of the engagement member 75 shown in FIGS. 7 and 8 is also referred to as an engagement position.

On the other hand, when the engagement member 75 is moved radially outward against the biasing force of the spring member 77 and the projection 751 is moved out of the annular recess 736, the projection 751 can no longer be engaged with the groove 611 of the shaft part 61. This position of the engagement member 75 is also referred to as a disengagement position. Further, as will be described in more detail later, a movement of the engagement member 75 to the disengagement position can be realized when the shaft part 61 pushes the engagement member 75 downward or the retainer 73 moves downward.

A method of replacing the tool accessory 91 is now described. In the replacement process, the fixing part 7 is detached from and attached to the shaft part 61.

First, a user removes the tool accessory 91 fixed to the tool mounting part 51 by the clamping mechanism 6. Specifically, the user performs an unclamping operation of moving the operation member 80 from the working position shown in FIG. 3 to the tool-replacement position shown in FIG. 6, by turning the lever 81 from the front position to the upper position. Accordingly, the unclamping mechanism 8 is operated as described above to move the clamp shaft 60 from the clamping position to the unclamping position and to release the clamping force of the fixing part 7 from the tool accessory 91.

When the tool accessory 91 is oscillatorily driven while being pressed against the tool mounting part 51 from below by the fixing part 7 with the inclined surface 913 being in abutment with the inclined surface 513 (see FIG. 4), the tool accessory 91 may be stuck to the tool mounting part 51. In such a case, when the unclamping operation is performed, the clamp shaft 60 starts moving downward while the tool accessory 91 remains stuck to the tool mounting part 51. Then, the flange part 619, which is spaced upward from the tool accessory 91 when the tool accessory 91 is clamped, abuts on the tool accessory 91 from above in the process of the downward movement of the clamp shaft 60, as shown in FIG. 6. When the clamp shaft 60 further moves downward in this state, the flange part 619 pushes the tool accessory 91 downward. Thus, the shaft part 61 can eliminate the stuck state of the tool accessory 91 by the downward movement. In the present embodiment, the shaft part 61 abuts on an upper surface of the protruding part 911 of the tool accessory 91 via a lower surface of the flange part 619. Specifically, the shaft part 61 is configured to come in surface contact with the upper surface of the tool accessory 91 in an annular region around the driving axis A1.

Figure 11:
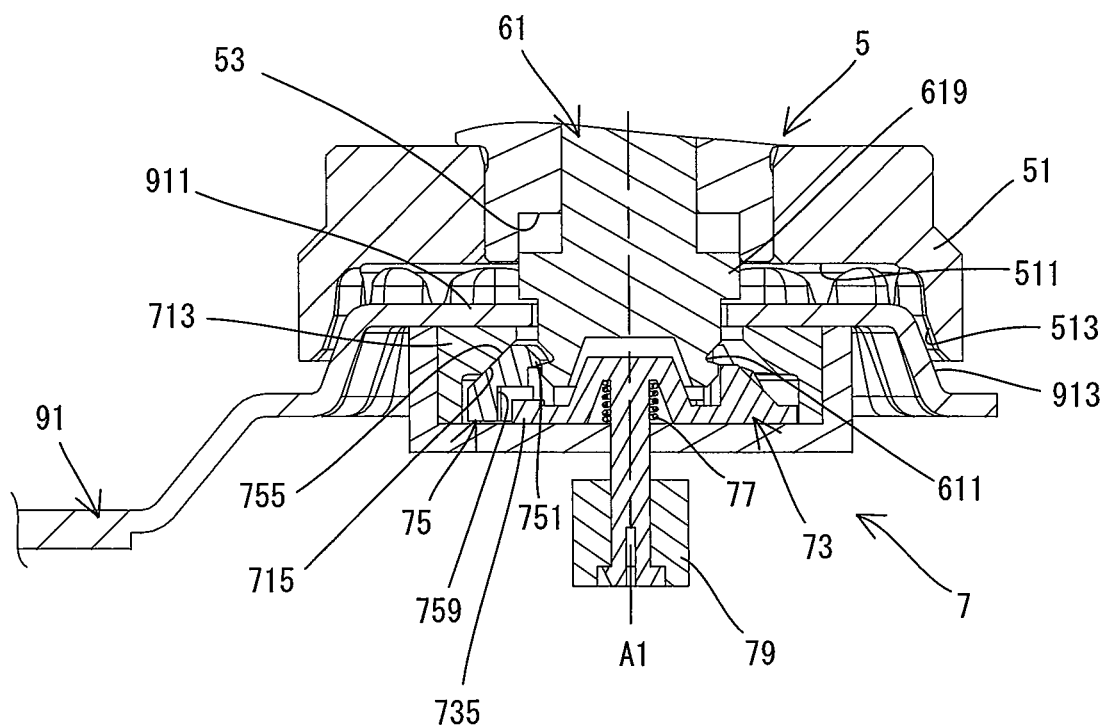
FIG. 11 is a sectional view, showing a spindle and a clamping mechanism, for illustrating a process of removing the fixing part from the shaft part.
Figure 12:
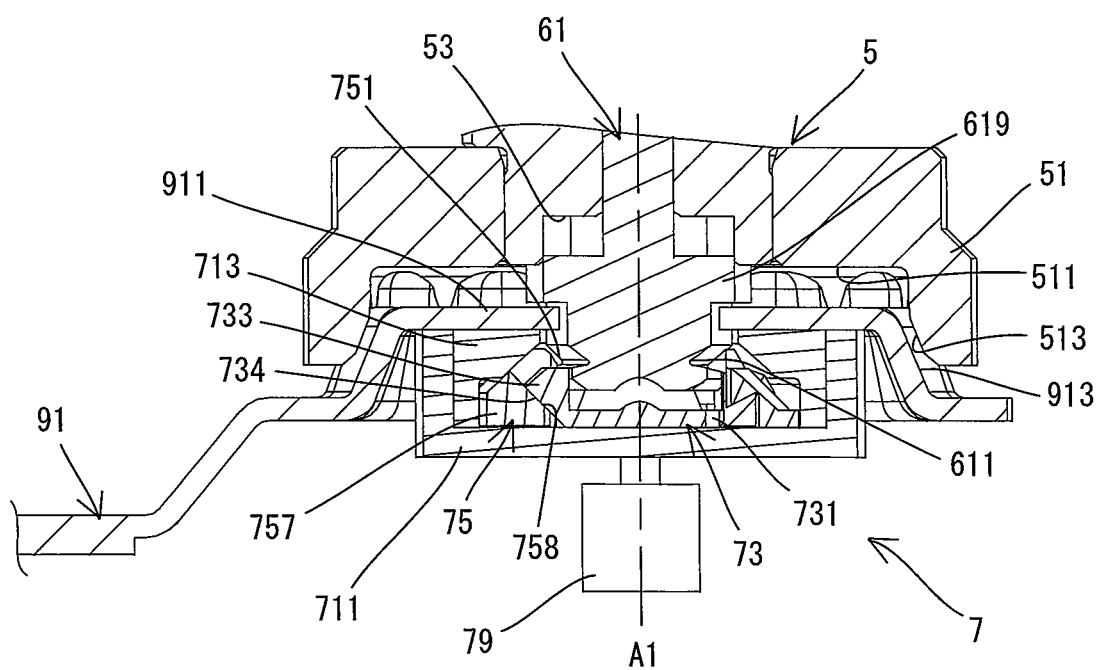
FIG. 12 is a sectional view similar to FIG. 11 but taken at a different position, showing the spindle and the clamping mechanism, for illustrating the process of removing the fixing part from the shaft part.

The user removes the fixing part 7 from the shaft part 61 placed in the unclamping position. Specifically, as shown in FIG. 11, the user holds and pulls down the knob 79 provided on the lower side of the case 71 to move the retainer 73 downward against the biasing force of the spring member 77. Thus, as shown in FIG. 12, the retainer 73 pushes the engagement members 75 downward via the abutment parts 733 which abut on the respective shoulder parts 757 from above. Specifically, each of the engagement members 75 slides downward and radially outward by cooperation between the inclined surfaces 758 of the shoulder parts 757 and the inclined surfaces 734 of the abutment parts 733. At this time, the engagement members 75 are each guided along the inclined surface 715. When the body 731 of the retainer 73 reaches a position where the body 731 abuts on the bottom-wall part 711 of the case 71, the engagement members 75 are placed in their respective disengagement positions where the projections 751 are located outside the annular recess 736 and cannot be engaged with the groove 611.

The user can remove the fixing part 7 and then the tool accessory 91 from the shaft part 61 by pulling out downward from the leading end part 610. When the fixing part 7 is removed from the shaft part 61 and the pulling operation of the knob 79 is released, the retainer 73 is biased upward by the biasing force of the spring member 77, and the engagement members 75 slide upward and radially inward by cooperation between the inclined surfaces 755 of the engagement members 75 and the inclined surface 715 of the case 71, and return to their respective engagement positions (see FIG. 8).

Thereafter, the user fits another tool accessory 91 onto the leading end part 610 and linearly moves the fixing part 7 upward from below the shaft part 61 along the driving axis A1. At this time, the user needs to align the fixing part 7 to be coaxial with the shaft part 61. Unlike when removing the fixing part 7, however, the user need not operate the knob 79 to move the retainer 73 downward. When the leading end part 610 is inserted into the annular recess 736, the lower end surface of the leading end part 610 abuts on the projections 751 of the engagement members 75 protruding into the annular recess 736 from above, and pushes down the projections 751. At this time, the inclined surface formed along the peripheral edge of the lower end of the leading end part 610 abuts on the upper inclined surface of the projection 751, so that a radially outward force is applied to the engagement member 75, against the biasing force of the spring member 77. The engagement members 75 slide downward and radially outward along the inclined surface 715 of the upper-wall part 713 and move to their respective disengagement positions. Accordingly, the retainer 73 is pushed downward via the projections 735 by the engagement members 75.

Figure 13:
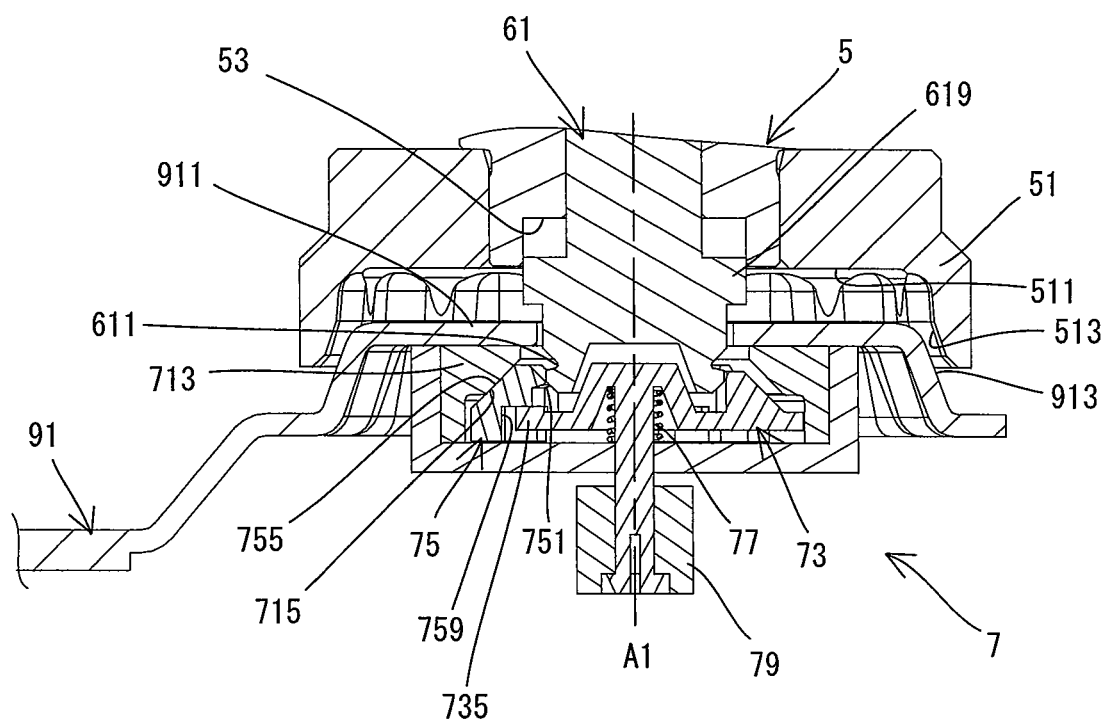
FIG. 13 is a sectional view, showing the spindle and the clamping mechanism, for illustrating a process of mounting the fixing part to the shaft part.

As shown in FIG. 13, when the engagement members 75 reach the respective disengagement positions, abutment between the inclined surface of the leading end part 610 and the upper inclined surfaces of the projections 751 is released. Then the fixing part 7 is further moved upward relative to the shaft part 61 with tips of the projections 751 being in abutment with an outer peripheral surface of the leading end part 610. When the projections 751 reach respective positions where the projections 751 face the groove 611, the engagement members 75 are biased radially inward by the biasing force of the spring member 77 and return to their respective engagement positions, so that the projections 751 are engaged with the groove 611. This completes the operation of mounting the fixing part 7 to the shaft part 61.

The user performs the clamping operation of moving the operation member 80 from the tool-replacement position (see FIG. 6) to the working position (see FIG. 3), by turning the lever 81 from the upper position to the front position, so that the biasing force of the spring member 65 is no longer applied to the operation member 80 via the eccentric part 831. Thus, the clamp shaft 60 is biased upward by the spring member 65 and returned to the clamping position. Then, the tool accessory 91 is fixed to the tool mounting part 51 with the inclined surface 913 being in abutment with the inclined surface 513 by the clamping force imparted to the fixing part 7 (see FIG. 4). This completes replacement of the tool accessory 91.

As described above, according to the present embodiment, the clamping mechanism 6 is configured such that the clamp shaft 60 is biased upward by the spring member 65 and the fixing part 7 presses the tool accessory 91 against the lower end portion (the tool mounting part 51) of the spindle 5 from below to thereby fix the tool accessory 91. Further, the fixing part 7 is configured to be removable from the shaft part 61, so that the fixing part 7 can be removed from the shaft part 61 for replacement of the tool accessory 91.

Conventionally, a work tool is known which is configured such that a clamp shaft inserted into a spindle and biased upward is held by clamp members disposed inside the spindle and a tool accessory is clamped between a lower end portion of the clamp shaft and a lower end portion of the spindle. In this work tool, for replacement of the tool accessory, the clamp shaft is pulled out of a hole of the spindle. In the clamping mechanism 6 of the present embodiment, however, the fixing part 7 can be removed for replacement of the tool accessory 91, so that the shaft part 61 can be left in the through hole 50 of the spindle 5. Therefore, foreign matters can be prevented from entering the housing 10 through the through hole 50. Further, for example, if any defect occurs in the fixing part 7, the fixing part 7 can be removed from the shaft part 61 for repair, so that the need for a large-scale work of disassembling the housing 10 can be eliminated.

Further, the user can easily mount the fixing part 7 to the shaft part 61 by simply moving the fixing part 7 upward relative to the shaft part 61. In other words, the user can easily mount the fixing part 7 to the shaft part 61 with a single operation. Thus, the clamping mechanism 6 of the present embodiment is also excellent in convenience.

In the present embodiment, the fixing part 7 is coupled to the shaft part 61 by the engagement members 75 which are housed within the case 71 so as to be movable between their respective engagement positions and the disengagement positions and biased toward the engagement positions. Therefore, engagement of the engagement members 75 with the shaft part 61, or coupling of the fixing part 7 to the shaft part 61, can be normally maintained by the biasing force toward the engagement positions. Further, the coupling of the fixing part 7 to the shaft part 61 can be released by simply moving the engagement members 75 against the biasing force.

Particularly, in the present embodiment, when the fixing part 7 is coupled to the shaft part 61, the retainer 73 which is biased upward by the spring member 77 and abuts on the engagement members 75 applies a biasing force to the engagement members 75 toward their respective engagement positions. On the other hand, when the fixing part 7 is removed from the shaft part 61, the retainer 73 is moved downward against the biasing force of the spring member 77 and causes the engagement members 75 to be moved to their respective disengagement positions. Thus, the retainer 73 performs a function of holding the engagement members 75 in the engagement positions and a function of moving the engagement members 75 to the disengagement positions. Further, by simply pulling down the knob 79 provided on the lower side of the case 71, the user can move the retainer 73 downward against the biasing force of the spring member 77 and reliably move the engagement members 75 to the disengagement positions to disengage the engagement members 75 from the shaft part 61. Further, in the present embodiment, the engagement members 75 can be reliably moved from the engagement positions to the radially outward disengagement positions along with the downward movement of the retainer 73 by a simple structure that the inclined surfaces 734 and the inclined surfaces 758 cooperate in abutment with each other.

In the present embodiment, the fixing part 7 is coupled to the shaft part 61 by engagement of the projections 751 of the engagement members 75 with the groove 611 formed in the outer periphery of the lower end portion of the shaft part 61. The inclination angle of the lower inclined surface of the projection 751 relative to the driving axis A1 is larger than that of the upper inclined surface of the projection 751. Thus, the inclination angle of the lower inclined surface of the projection 751 relative to the driving axis A1 is closer to 90 degrees, compared to the upper inclined surface. Therefore, the fixing part 7 is capable of firmly receiving the upward moving force of the shaft part 61 via the lower inclined surface of the projection 751 and strongly pressing the tool accessory 91 against the tool mounting part 51.

In the above-described known work tool, the clamp shaft is held by engagement between a plurality of projections and grooves (teeth) which are respectively provided in the clamp members and the clamp shaft. However, the clamp members are not moved radially outward even if the clamping force is released. In such a structure, it is difficult to make the inclination angle of the lower inclined surface larger than that of the upper inclined surface, in order to facilitate disengagement between the projections and the grooves when pulling out the clamp shaft. The present embodiment, however, employs the structure of forcibly moving the engagement member 75 to the radially outward disengagement position by cooperation between the inclined surfaces 734 of the retainer 73 and the inclined surfaces 758 of the engagement member 75. This structure can allow the inclination angle of the lower inclined surface to be larger than that of the upper inclined surface.

Further, in the present embodiment, the upper-wall part 713 of the case 71 and each of the engagement members 75 respectively have the inclined surface 715 and the inclined surface 755 which conform to each other and abut on each other. Each of the engagement members 75 can be moved in the radial direction of the driving axis A1 between the engagement position and the disengagement position. When the fixing part 7 is coupled to the shaft part 61, the engagement member 75 is pressed against the upper-wall part 713 by the retainer 73 biased upward, and is biased radially inward toward the engagement position by cooperation between the inclined surfaces 715 and 755. Further, the inclination angle of the lower inclined surface of the projection 751 relative to the driving axis A1 is set to be larger than the inclination angles of the inclined surfaces 715 and 755 relative to the driving axis A1. Thus, the structure can be realized which is capable of firmly receiving the biasing force of biasing the clamp shaft 60 upward by the lower inclined surface of the projection 751 while firmly engaging the projection 751 with the groove 611 by biasing the projection 751 radially inward.

In the present embodiment, each of the engagement members 75 is configured to be pushed by the lower end surface of the shaft part 61 to move from the engagement position to the disengagement position and thereafter biased to return to the engagement position where the projection 751 is engaged with the groove, in the process of the upward movement of the fixing part 7 relative to the shaft part 61. Thus, a simple structure for integrally coupling the fixing part 7 to the shaft part 61 only by moving the fixing part 7 upward relative to the shaft part 61 is realized.

Further, in the oscillating tool 1 of the present embodiment, the tool accessory 91 is clamped and firmly fixed to the spindle 5, with the inclined surface 913 being in abutment with the inclined surface 513 of the tool mounting part 51, by the clamping force imparted to the fixing part 7 by the spring member 65. When the tool accessory 91 is oscillatorily driven in this state, the tool accessory 91 may be stuck to the tool mounting part 51. In the oscillating tool 1 of the present embodiment, however, the operation member 80 is configured to release the clamping force of the fixing part 7 and move the clamp shaft 60 downward from the clamping position in response to the unclamping operation. In the process of the downward movement of the clamp shaft 60, the shaft part 61 can abut on the tool accessory 91 from above and push the tool accessory 91 downward. Therefore, the user can easily remove the tool accessory 91 from the tool mounting part 51 even when the tool accessory 91 is stuck to the tool mounting part 51.

Further, in the present embodiment, the spring receiving part 63 integrally provided on the clamp shaft 60 is configured to release the clamping force. Specifically, in response to the unclamping operation, the spring receiving member 63 is moved downward together with the shaft part 61 by the operation member 80, and thereby releases the clamping force. Thus, in the present embodiment, a simple structure of the spring receiving 63 integrally provided on the shaft part 61 can realize releasing of the clamping force along with the downward movement of the clamp shaft 60.

Further, in the present embodiment, the shaft part 61 is inserted through the spindle 5, and the inner peripheral surface of the spindle 5 is configured as the guide surface to guide the movement of the shaft part 61 in the up-down direction. This simple structure can stabilize the movement of the clamp shaft 60 in the up-down direction. It is noted that, in the present embodiment, the inner peripheral surface of the spindle housing part 111, along which the bearing 633 slides, can also function as a guide surface to guide the movement of the shaft part 61 in the up-down direction. However, the bearing 633 may be omitted such that the clamp shaft 60 is supported only by the spindle 5.

Correspondences between the features of the above-described embodiment and the features of the disclosure are as follows. The oscillating tool 1 is an example that corresponds to the "work tool". The tool accessory 91 is an example that corresponds to the "tool accessory". The driving axis A1 is an example that corresponds to the "driving axis". The spindle 5 is an example that corresponds to the "spindle". The tool mounting part 51 is an example that corresponds to the "lower end portion of the spindle". The clamp shaft 60 is an example that corresponds to the "clamp shaft". The shaft part 61 is an example that corresponds to the "shaft part". The fixing part 7 is an example that corresponds to the "fixing part". The case 71 is an example that corresponds to the "housing member". The engagement member 75 is an example that corresponds to the "engagement member". The spring member 77 is an example that corresponds to the "spring member". The retainer 73 is an example that corresponds to the "spring receiving member". The inclined surface 758 is an example that corresponds to the "first inclined surface". The inclined surface 734 is an example that corresponds to the "second inclined surface". The groove 611 is an example that corresponds to the "groove". The projection 751 is an example that corresponds to the "projection". The upper-wall part 713 is an example that corresponds to the "upper-wall part". The inclined surface 715 is an example that corresponds to the "third inclined surface". The inclined surface 755 is an example that corresponds to the "fourth inclined surface". The knob 79 is an example that corresponds to the "operation part".

The above-described embodiment is a mere example and a work tool according to the present invention is not limited to the structure of the oscillating tool 1 of the above-described embodiment. For example, the following modifications may be made. One or more of these modifications may be employed in combination with the oscillating tool 1 of the above-described embodiment or the claimed invention.

For example, the work tool according to the present invention may be embodied as a rotary tool (such as a grinder, a sander and a polisher) configured to rotationally drive the tool accessory 91.

The structure of the clamping mechanism 6 (for example, the shapes, arrangements and support structures of the clamp shaft 60 and the spring member 65) may be appropriately changed. For example, in the above-described embodiment, the clamp shaft 60 is biased upward relative to the spindle 5 by the spring member 65, which is disposed between the spring receiving part 63 fixed to the upper end portion of the shaft part 61 and the spindle 5. However, the spring member 65 may be disposed somewhere else (for example, within the through hole 50 of the spindle 5), as long as the spring member 65 is capable of biasing the clamp shaft 60 upward relative to the spindle 5. Further, the clamp shaft 60 only needs to be configured to be movable in the up-down direction relative to the spindle 5 and rotatable around the driving axis A1 relative to the housing (tool body) 10. For example, the clamp shaft 60 may be supported only by the spindle 5. Specifically, the bearing 633 may be omitted. As the spring member 65, for example, a tension coil spring, a torsion spring, a disc spring or a rubber spring may be employed, in place of the compression coil spring.

The structure of the fixing part 7 may be appropriately changed as long as the fixing part 7 is configured to be removably mounted to the shaft part 61 and to be integrally coupled to the shaft part 61 only by moving upward relative to the shaft part 61. Typically, the fixing part 7 may be configured as a member shaped like a flange which protrudes radially outward from the shaft part 61.

The number of the engagement members 75 is not limited to three, but preferably two or more. Further, for example, the engagement member 75 may be housed in the case 71 and directly biased radially inward by a spring member. In other words, the engagement member 75 need not be biased via a spring receiving member like the retainer 73. Further, the engagement member 75 may be moved in a direction other than the radial direction between the engagement position and the disengagement position. The shapes, arrangements and numbers of the projection 751 of the engagement member 75 and the inclined surfaces 755 and 758 may be appropriately changed. Accordingly, the structures of the groove 611 of the shaft part 61 and the retainer 73 may also be changed. As the spring member 77, for example, a tension coil spring, a torsion spring, a disc spring or a rubber spring may be employed, in place of the compression coil spring.

The unclamping mechanism 8 is not limited to that of the above-described embodiment and may be appropriately changed. For example, the spring receiving part 63 need not be fixed to the shaft part 61, but may be separated from the clamp shaft 60. For example, the spring receiving part 63 may be disposed to be slidable in the up-down direction relative to the shaft part 61 while receiving the upper end of the spring member 65. Further, the shaft part 61 may have a stopper configured to abut on an upper end of the spring receiving part 63. In this case, the spring receiving part 63 may be pushed downward by the operation member 80 (the eccentric part 631) in response to an unclamping operation, so that the shaft part 61 is no longer biased upward and the clamping force of the fixing part 7 is released. The clamp shaft 60 may be pulled downward by a user or pushed downward by another structure which interlocks with the unclamping operation. The structure (for example, the shape, arrangement, support structure and structure of pressing the spring receiving part 63) of the operation member 80 (the lever 81 and the support shaft 83) may be appropriately changed.

The structure (for example, the shape and support structure) of the spindle 5 is not limited to those described in the above-described embodiment, but may be appropriately changed. For example, the spindle 5 may be formed by integrally connecting a plurality of members. In the above-described embodiment, the tool mounting part 51 has the recess 511 corresponding to the protruding part 911 of the tool accessory 91, and the tool accessory 91 is fixed to the tool mounting part 51 with the inclined surface 913 being in abutment with the inclined surface 513 of the tool mounting part 51. However, the tool mounting part 51 may be configured to have a planar lower surface to which the tool accessory having a planar upper surface is fixed. In this case, in order to position the tool accessory relative to the tool mounting part 51, the tool mounting part 51 and the tool accessory may have a projection and a fitting hole, respectively.

The structures of the housing 10, the motor 3 and the driving mechanism 4 may be appropriately changed. For example, the housing 10 need not be a vibration-isolating housing including the inner housing 11 and the outer housing 13 which are elastically connected to each other, but may be a housing having a single-layer structure. Further, for example, the motor 3 may be an alternate current (AC) motor. The motor 3 may be housed within the grip part such that the rotation axis A2 of the output shaft 31 is orthogonal to the driving axis A1.

Further, in view of the nature of the present invention, the above-described embodiment and the modifications thereto, the following features are provided. Each of the features can be employed independently or in combination with any one of the oscillating tool 1 of the above-described embodiment, the above-described modifications and the claimed invention.

(Aspect 1)

The work tool incudes a biasing member configured to bias the clamp shaft upward relative to the spindle.

The spring member 65 of the above-described embodiment is an example that corresponds to the "biasing member" according to the present aspect.

(Aspect 2)

The shaft part is inserted through the spindle so as to be unable to be pulled out of the spindle.

(Aspect 3)

The engagement member is movable in a radial direction relative to the driving axis, and the disengagement position is located radially outward of the engagement position.

(Aspect 4)

In aspect 3, the engagement member is also movable in the up-down direction relative to the housing member, and the disengagement position is located below the engagement position.

(Aspect 5)

An upper-wall part of the housing member and the engagement member respectively have a third inclined surface and a fourth inclined surface which are inclined relative to the driving axis, and the engagement member is movable between the engagement position and the disengagement position with the third inclined surface and the fourth inclined surface sliding with each other.

The upper-wall part 713 of the above-described embodiment is an example that corresponds to the "upper-wall part" according to the present aspect. The inclined surface 715 is an example that corresponds to the "third inclined surface" according to the present aspect. The inclined surface 755 is an example that corresponds to the "fourth inclined surface" according to the present aspect.

(Aspect 6)

The engagement member is pressed against the upper-wall part by the spring receiving member and biased radially inward by cooperation between the third inclined surface and the fourth inclined surface which abut on each other.

(Aspect 7)

The projection has a V-shaped section and an apex angle of the section of the projection is smaller than 90 degrees.

(Aspect 8)

The inclination angle of a lower surface of the projection relative to the driving axis is larger than 45 degrees, preferably 60 degrees or more, and more preferably 75 degrees or more.

(Aspect 9)

The inclination angle of a lower surface of the groove relative to the driving axis is larger than the inclination angle of an upper surface of the groove relative to the driving axis.

(Aspect 10)

The groove has a V-shaped section and an apex angle of the section of the groove is smaller than 90 degrees.

(Aspect 11)

An upper end portion of the projection has an inclined surface inclined downward and radially inward, and the lower end surface of the shaft part pushes the inclined surface of the engagement member from above to move the engagement member radially outward to the disengagement position in a process of an upward movement of the fixing part relative to the shaft part.

Further, in order to provide a technique which may contribute to easier removal of the tool accessory from a work tool configured to oscillatory drive the tool accessory, the following features 12 to 23 are provided. Each of the features can be employed independently or in combination with any one of the oscillating tool 1 of the above-described embodiment, the above-described modifications, the above-described aspects, and the claimed invention.

(Aspect 12)

A work tool configured to perform an operation on a workpiece by oscillatorily driving a tool accessory, the work tool comprising:

a spindle configured to be reciprocally rotated within a specified angle range around a driving axis, the driving axis defining an up-down direction of the work tool, the spindle having a lower end portion having a first inclined surface inclined in a direction crossing the driving axis;

a clamp shaft having a shaft part and a fixing part and supported to be movable in the up-down direction relative to the spindle, the shaft part extending coaxially with the spindle, the fixing part being coupled to the shaft part on a lower side of the spindle;

a biasing member biasing the clamp shaft toward a specified upper position; and an operation member configured to be externally operated by a user, wherein:

the fixing part is configured to clamp the tool accessory in cooperation with the spindle, while pressing a second inclined surface of the tool accessory against the first inclined surface from below, by a clamping force imparted by the biasing member, when the clamp shaft is placed in the upper position, the operation member is configured to release the clamping force and move the clamp shaft downward from the upper position in response to an unclamping operation, and the shaft part is configured to move the tool accessory downward in abutment with the tool accessory from above, in a process of a downward movement of the clamp shaft, and thereby push the tool accessory downward.

In the work tool of the present aspect, the tool accessory is clamped and firmly fixed to the spindle, with the second inclined surface being pressed against the first inclined surface from below, by the clamping force imparted to the fixing part. When the tool accessory is oscillatorily driven in this state, the tool accessory may be stuck to the lower end portion of the spindle. In the oscillating tool of the present aspect, however, the operation member is configured to release the clamping force of the fixing part and to move the clamp shaft downward from the upper position in response to the unclamping operation. In the process of the downward movement of the clamp shaft, the shaft part can abut on the tool accessory, which is stuck to the lower end portion of the spindle, from above and push the tool accessory downward. Therefore, the user can easily remove the tool accessory even when the tool accessory is stuck to the lower end portion of the spindle.

In the present aspect, typically, the first and second inclined surfaces may be configured as matching surfaces which are inclined upward in a direction toward the driving axis. It is noted that each of the first and second inclined surfaces may be formed as a flat surface or a curved surface in its entirety. Alternatively, each of the first and second inclined surfaces may include a flat surface or a curved surface. Each of the first and second inclined surfaces may encircle the driving axis in an annular manner. A plurality of the first inclined surfaces or a plurality of the second inclined surfaces may be provided in the circumferential direction around the driving axis. The phrase "in a process of a downward movement of the clamp shaft" refers not only to the entire process of the movement but also to a portion of the process.

(Aspect 13)

The work tool as defined in aspect 12, wherein:

the clamp shaft has a releasing part integrally provided on the shaft part, and the releasing part is configured to be moved downward together with the shaft part against a biasing force of the biasing member by the operation member, in response to the unclamping operation, thereby releasing the clamping force.

According to the present aspect, the clamping force can be released by a simple structure along with the downward movement of the clamp shaft.

(Aspect 14)

The work tool as defined in aspect 12 or 13, wherein:

the shaft part is inserted through the spindle, and an inner peripheral surface of the spindle is configured as a guide surface to guide the movement of the clamp shaft in the vertical direction.

According to the present aspect, the movement of the clamp shaft in the up-down direction can be stabilized by a simple structure.

(Aspect 15)

The work tool as defined in any one of aspects 12 to 14, wherein:

the operation member is configured to be movable between a first position and a second position, and the operation member is configured not to receive a biasing force of the biasing member in the first position and to receive the biasing force of the biasing member when the unclamping operation of moving the operation member from the first position to the second position is performed.

According to the present aspect, the operation member can be prevented from affecting the clamping force when the operation member is placed in the first position.

(Aspect 16)

The work tool as defined in any one of aspects 12 to 15, wherein the fixing part is configured to be removable from the shaft part.

According to the present aspect, a user can remove only the fixing part from the shaft part and easily replace the tool accessory.

(Aspect 17)

The work tool as defined in aspect 16, wherein the fixing part is configured to be integrally coupled to the shaft part only by moving upward relative to the shaft part.

According to the present aspect, the fixing part can be easily coupled to the shaft part with a simple operation, which improves convenience.

(Aspect 18)

The work tool as defined in any one of aspects 12 to 17, wherein the shaft part includes an abutment part provided on the upper side of the fixing part and configured to linearly move together with the shaft part and abut on the tool accessory from above.

(Aspect 19)

The work tool as defined in any one of aspects 13 to 18, wherein:

the releasing part is fixed to an upper end portion of the clamp shaft, the biasing member is a spring member disposed between the spindle and the releasing part, and the releasing part is configured to be moved downward together with the shaft part while compressing the spring member to thereby release the clamping force.

(Aspect 20)

The work tool as defined in any one of aspects 15 to 19, wherein the operation member is held in the second position by the biasing force.

(Aspect 21)

The work tool as defined in any one of aspects 15 to 20, wherein:

the operation member is rotatable around a specified rotation axis between the first position and the second position, the operation member has an eccentric part, and the operation member is configured such that the eccentric part abuts on the releasing part and pushes down the releasing part, in response to the unclamping operation.

(Aspect 22)

The work tool as defined in any one of aspects 12 to 21, wherein the fixing part includes:

a housing member; and an engagement member housed in the housing member so as to be movable between an engagement position and a disengagement position, the engagement member being engageable with the shaft part in the engagement position and not engageable with the shaft part in the disengagement position.

(Aspect 23)

The work tool as defined in any one of aspects 12 to 22, wherein the first and second inclined surfaces are inclined upward in a direction toward the driving axis.

Correspondences between the features of the above-described embodiment and the features of aspects 12 to 23 are as follows.

The oscillating tool 1 is an example that corresponds to the "work tool". The driving axis A1 is an example that corresponds to the "driving axis". The spindle 5 is an example that corresponds to the "spindle". The tool mounting part 51 and the inclined surface 513 are examples that correspond to the "lower end portion of the spindle" and the "first inclined surface", respectively. The tool accessory 91 and the inclined surface 913 are examples that correspond to the "tool accessory" and the "second inclined surface", respectively. The clamp shaft 60 is an example that corresponds to the "clamp shaft". The shaft part 61 is an example that corresponds to the "shaft part". The fixing part 7 is an example that corresponds to the "fixing part". The clamping position (uppermost position) of the clamp shaft 60 is an example that corresponds to the "upper position". The spring member 65 is an example that corresponds to the "biasing member". The operation member 80 is an example that corresponds to the "operation member". The working position and the tool-replacement position of the operation member 80 are examples that correspond to the "first position" and the "second position", respectively. The spring receiving part 63 is an example of the "releasing part". The flange part 619 is an example of the "abutment part". The case 71 and the engagement member 75 are examples of the "housing member" and the "engagement member", respectively.

The work tool according to any one of aspects 12 to 23 is not limited to the structure of the oscillating tool 1 of the above-described embodiment. For example, the following modifications may be made. One or more of these modifications may be employed in combination with any one of the oscillating tool 1 of the above-described embodiment and the above-described aspects.

The structure of the clamping mechanism 6 (for example, the shapes, arrangements and support structures of the clamp shaft 60 and the spring member 65) may be appropriately changed. For example, in the above-described embodiment, the clamp shaft 60 is biased upward relative to the spindle 5 by the spring member 65, which is disposed between the spring receiving part 63 fixed to the upper end portion of the shaft part 61 and the spindle 5. However, the spring member 65 may be disposed somewhere else (for example, within the through hole 50 of the spindle 5), as long as the spring member 65 is capable of biasing the clamp shaft 60 upward relative to the spindle 5. As the spring member 65, for example, a tension coil spring, a torsion spring, a disc spring or a rubber spring may be employed, in place of the compression coil spring.

The structure for abutting on and pushing down the tool accessory 91 from above in the process of the downward movement of the clamp shaft 60 is not limited to the flange part 619 described as an example in the embodiment. The shaft part 61 may include an abutment part which is disposed on the upper side of the fixing part 7 and configured to linearly move together with the shaft part 61 and abut on the tool accessory 91 from above. In order to more reliably eliminate the stuck state of the tool accessory 91, the abutment part and the tool accessory 91 may preferably come in contact with each other at plural locations around the shaft part 61, and more preferably, come in contact with each other in an annular manner around the shaft part 61. It may be further preferable that the abutment part and the tool accessory 91 come in surface contact with each other. The abutment part may be in contact with the tool accessory 91 over the entire moving process in which the clamp shaft 60 moves from the clamping position (uppermost position) to the unclamping position (lowermost position) or only in a portion of the process.

The structure of the fixing part 7 may be appropriately changed. The fixing part 7 may be removable from the shaft part 61, or may be fixed not to be removable from the shaft part 61.

The unclamping mechanism 8 is not limited to that of the above-described embodiment and may be appropriately changed. For example, the spring receiving part 63 need not be fixed to the shaft part 61, but may be separated from the clamp shaft 60. For example, the spring receiving part 63 may be disposed to be slidable in the up-down direction relative to the shaft part 61 while receiving the upper end of the spring member 65. Further, the shaft part 61 may have a stopper configured to abut on an upper end of the spring receiving part 63. In this case, the spring receiving part 63 may be pushed downward by the operation member 80 (the eccentric part 631) in response to an unclamping operation, so that the shaft part 61 is no longer biased upward and the clamping force of the fixing part 7 is released. In this case, the clamp shaft 60 is not forcibly pushed downward. Therefore, an additional structure may be separately provided for pushing down the clamp shaft 60 in interlock with the unclamping operation (for example, at a timing different from the releasing of the clamping force).

The structure (for example, the shape, arrangement, support structure and structure of pressing the spring receiving part 63) of the operation member 80 (the lever 81 and the support shaft 83) may also be appropriately changed. Further, the operation member 80 may indirectly (via a separate member) release the clamping force and move the clamp shaft 60 downward.

The structure (for example, the shape and support structure) of the spindle 5 is not limited to those described in the above-described embodiment, but may be appropriately changed. For example, the spindle 5 may be formed by integrally connecting a plurality of members. In the above-described embodiment, the tool mounting part 51 has the recess 511 corresponding to the protruding part 911 of the tool accessory 91, and the tool accessory 91 is fixed to the tool mounting part 51 with the inclined surface 913 being in abutment with the inclined surface 513 of the tool mounting part 51. However, the tool mounting part 51 may be configured to have a planar lower surface to which the tool accessory having a planar upper surface is fixed. In this case, in order to position the tool accessory relative to the tool mounting part 51, the tool mounting part 51 and the tool accessory may have a projection and a fitting hole, respectively. In this case, the projection and the fitting hole may have matching inclined surfaces which are inclined relative to the driving axis A1, similar to the inclined surfaces 513 and 913 in the embodiment.

The structures of the housing 10, the motor 3 and the driving mechanism 4 may be appropriately changed. For example, the housing 10 need not be a vibration-isolating housing including the inner housing 11 and the outer housing 13 which are elastically connected to each other, but may be a housing having a single-layer structure. Further, for example, the motor 3 may be an alternate current (AC) motor. The motor 3 may be housed within the grip part such that the rotation axis A2 of the output shaft 31 is orthogonal to the driving axis A1.

DESCRIPTION OF THE NUMERALS

1: oscillating tool, 10: housing, 11: inner housing, 111: spindle housing part, 13: outer housing, 15: controller, 17: battery mounting part, 3: motor, 31: output shaft, 4: driving mechanism, 41: eccentric shaft, 411: eccentric part, 43: oscillating arm, 45: drive bearing, 5: spindle, 50: through hole, 501: bearing, 502: bearing, 51: tool mounting part, 511: recess, 513: inclined surface, 53: recess, 6: clamping mechanism, 60: clamp shaft, 61: shaft part, 610: lower end part, 611: groove, 619: flange, 63: spring receiving part, 631: abutment part, 633: bearing, 65: spring member, 69: spring receiving member, 7: fixing part, 71: case, 711: bottom-wall part, 712: peripheral-wall part, 713: upper-wall part, 715: inclined surface, 73: retainer, 731: body, 732: holding recess, 733: abutment part, 734: inclined surface, 735: projection, 736: annular recess, 739: leg part, 75: engagement member, 751: projection, 755: inclined surface, 757: shoulder part, 758: inclined surface, 759: recess, 77: spring member, 79: knob, 8: unclamping mechanism, 80: operation member, 81: lever, 83: support shaft, 831: eccentric part, 91: tool accessory, 911: protruding part, 913: inclined surface, 93: battery, A1: driving axis, A2: rotation axis, A3: rotation axis, A4: central axis, OP: oscillation plane

What is claimed is:

1. A work tool configured to perform an operation on a workpiece by driving a tool accessory in an oscillating manner, the work tool comprising:
    a spindle configured to be reciprocally rotated within a specified angle range around a driving axis, the driving axis defining an up-down direction of the work tool, the spindle having a lower end portion having a first inclined surface inclined in a direction crossing the driving axis;
    a clamp shaft having a shaft part and a fixing part and supported to be movable in the up-down direction relative to the spindle, the shaft part extending coaxially with the spindle, the fixing part being coupled to the shaft part below the spindle;
    a biasing member configured to bias the clamp shaft toward a specified upper position; and
    an operation member configured to be externally manipulated by a user, wherein:
the fixing part is configured to clamp the tool accessory in cooperation with the spindle, while pressing a second inclined surface of the tool accessory against the first inclined surface from below, owing to a clamping force imparted to the clamp shaft by the biasing member, when the clamp shaft is placed in the upper position,
the operation member is configured to release the clamping force imparted to the clamp shaft and move the clamp shaft downward from the upper position in response to an unclamping operation performed on the operation member, and
the shaft part is configured to move the tool accessory downward in abutment with the tool accessory from above without substantially displacing in a direction perpendicular to the driving axis, in a process of a substantially linear downward movement of the clamp shaft, and thereby push the tool accessory downward.

2. The work tool as defined in claim 1, wherein:
the clamp shaft has a releasing part integrally provided on the shaft part, and
the releasing part is configured to be moved downward by the operation member together with the shaft part against a biasing force of the biasing member, in response to the unclamping operation, thereby releasing the clamping force.

3. The work tool as defined in claim 2, wherein:
the biasing member is a spring disposed between the spindle and the releasing part, and
the releasing part is a spring seat disposed around the shaft part above the spring and abutting on an upper end of the spring,
the spring seat is configured to be moved downward together with the shaft part while compressing the spring to thereby release the clamping force.

4. The work tool as defined in claim 1, wherein:
the shaft part is inserted through the spindle, and
an inner peripheral surface of the spindle is configured as a guide surface to guide the movement of the clamp shaft in the up-down direction.

5. The work tool as defined in claim 1, wherein:
the operation member is movable between a first position and a second position, and
the operation member is configured not to receive a biasing force of the biasing member in the first position and to receive the biasing force of the biasing member in response to the unclamping operation of moving the operation member from the first position to the second position.

6. The work tool as defined in claim 5, wherein the operation member is held in the second position by the biasing force.

7. The work tool as defined in claim 5, wherein:
the operation member is a rotary lever that is rotatable around a rotation axis between the first position and the second position,
the operation member has an eccentric part, and
the operation member is configured such that the eccentric part abuts on a releasing part and pushes down the releasing part, in response to the unclamping operation.

8. The work tool as defined in claim 1, wherein the shaft part includes an abutment part disposed above the fixing part and configured to linearly move together with the shaft part and abut on the tool accessory from above.

9. The work tool as defined in claim 1, wherein the shaft part is a single straight shaft that extends along the driving axis.

10. A work tool configured to perform an operation on a workpiece by driving a tool accessory in an oscillating manner, the work tool comprising:
a spindle configured to be reciprocally rotated within a specified angle range around a driving axis, the driving axis defining an up-down direction of the work tool, the spindle having a lower end portion having a first inclined surface inclined in a direction crossing the driving axis;
a clamp shaft having a shaft part and a fixing part and supported to be movable in the up-down direction relative to the spindle, the shaft part extending coaxially with the spindle, the fixing part being coupled to the shaft part below the spindle;
a biasing member configured to bias the clamp shaft toward a specified upper position; and
an operation member configured to be externally manipulated by a user,
wherein:
the fixing part is configured to clamp the tool accessory in cooperation with the spindle, while pressing a second inclined surface of the tool accessory against the first inclined surface from below, owing to a clamping force imparted to the clamp shaft by the biasing member, when the clamp shaft is placed in the upper position,
the operation member is configured to release the clamping force imparted to the clamp shaft and move the clamp shaft downward from the upper position in response to an unclamping operation performed on the operation member,
the shaft part is configured to move the tool accessory downward in abutment with the tool accessory from above, in a process of a downward movement of the clamp shaft, and thereby push the tool accessory downward, and
the fixing part is removable from the shaft part.

11. The work tool as defined in claim 10, wherein the fixing part is configured to be integrally coupled to the shaft part only by moving the fixing part upward relative to the shaft part.

12. The work tool as defined in claim 10, wherein the fixing part includes:
a housing member; and
at least one engagement member housed in the housing member so as to be movable between an engagement position and a disengagement position, the engagement member being engageable with the shaft part in the engagement position and not engageable with the shaft part in the disengagement position.

13. A work tool configured to perform an operation on a workpiece by driving a tool accessory in an oscillating manner, the work tool comprising:
a spindle configured to be reciprocally rotated within a specified angle range around a driving axis, the driving axis defining an up-down direction of the work tool, the spindle having a lower end portion having a first inclined surface inclined in a direction crossing the driving axis;
a clamp shaft having a shaft part and a clamp head and supported to be movable in the up-down direction relative to the spindle, the shaft part extending coaxially with the spindle, the clamp head being coupled to the shaft part below the spindle;
a spring configured to bias the clamp shaft toward a specified upper position; and
a lever configured to be externally manipulated by a user, wherein:

the clamp head is configured to clamp the tool accessory in cooperation with the spindle, while pressing a second inclined surface of the tool accessory against the first inclined surface from below, owing to a clamping force imparted to the clamp shaft by the spring, when the clamp shaft is placed in the upper position, the lever is configured to release the clamping force imparted to the clamp shaft and move the clamp shaft downward from the upper position in response to an unclamping operation performed on the lever, and the shaft part is configured to move the tool accessory downward in abutment with the tool accessory from above without substantially displacing in a direction perpendicular to the driving axis, in a process of a substantially linear downward movement of the clamp shaft, and thereby push the tool accessory downward.

14. The work tool as defined in claim 13, wherein:

the clamp shaft has a spring seat disposed around the shaft part above the spring and abutting on an upper end of the spring, the spring seat is configured to be moved downward together with the shaft part while compressing the spring in response to the unclamping operation, thereby releasing the clamping force.

15. The work tool as defined in claim 14, wherein:

the shaft part is inserted through the spindle, and an inner peripheral surface of the spindle is configured as a guide surface to guide the movement of the clamp shaft in the up-down direction.

16. The work tool as defined in claim 15, wherein:

the lever is rotatable between a first position and a second position, the lever has a cam, the cam is disposed above the spring seat with a gap therebetween when the lever is in the first position, the cam abuts on the spring seat from above and pushes down the spring seat and the shaft part, in response to the unclamping operation of rotating the lever from the first position to the second position, and the cam is held in abutment with the spring seat from above and receives an upward biasing force of the spring when the lever is in the second position.

17. The work tool as defined in claim 16, wherein the clamp head is removable from the shaft part.

18. The work tool as defined in claim 17, wherein the clamp head is configured to be integrally coupled to the shaft part only by moving the clamp head upward relative to the shaft part.

19. The work tool as defined in claim 18, wherein the clamp head includes:

a case; and at least one engagement member housed in the case so as to be movable between an engagement position and a disengagement position, the engagement member being engageable with the shaft part in the engagement position and not engageable with the shaft part in the disengagement position.

20. The work tool as defined in claim 13, wherein the shaft part includes a flange part disposed above the clamp head and protruding radially outward, and the flange part is configured to come into surface contact with the tool accessory from above in an annular region around the driving axis.

* * * * *